US006477544B1

(12) United States Patent
Bolosky et al.

(10) Patent No.: US 6,477,544 B1
(45) Date of Patent: *Nov. 5, 2002

(54) SINGLE INSTANCE STORE FOR FILE SYSTEMS

(75) Inventors: William J. Bolosky, Issaquah; John R. Douceur, Bellevue; Scott M. Cutshall, Carnation; Richard F. Rashid, Redmond; Nathan P. Myhrvold, Bellevue; David A. Goebel, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/354,624

(22) Filed: Jul. 16, 1999

(51) Int. Cl.$^7$ .............................................. G06F 17/30
(52) U.S. Cl. ........................ 707/200; 1/3; 1/10; 1/100; 1/205
(58) Field of Search ........................ 707/1, 3, 10, 100, 707/200, 205

(56) References Cited

U.S. PATENT DOCUMENTS

| 5,410,667 A | | 4/1995 | Belsan et al. |
| 5,706,510 A | * | 1/1998 | Burgoon ..................... 395/619 |
| 5,778,384 A | | 7/1998 | Provino et al. |
| 5,778,395 A | * | 7/1998 | Whiting et al. ............. 707/204 |
| 5,907,673 A | | 5/1999 | Hirayama et al. |
| 5,918,229 A | * | 6/1999 | Davis et al. .................. 707/10 |
| 6,185,574 B1 | | 2/2001 | Howard et al. |

FOREIGN PATENT DOCUMENTS

| EP | 0 774 715 A1 | 5/1997 |
| WO | WO 99/09480 | 2/1999 |
| WO | WO 99/12098 | 3/1999 |
| WO | WO 99/21082 | 4/1999 |

OTHER PUBLICATIONS

Steere et al., "A Feedback–driven Proportion Allocator for Real–Rate Scheduling", *Third Symposium on Operating Systems Design and Implementation (OSDI '99)*, USENIX Association, pp. 145–158 (1999).
LaLonde, Ken, "Batch daemon—README", UNIX Batch Command, University of Toronto, pp. 1–3 (Feb. 27, 1997), ftp://ftp.cs.toronto.edu/pub/batch.tar.z printed Dec. 8, 2000.

* cited by examiner

*Primary Examiner*—Kim Vu
*Assistant Examiner*—Cam Y T Truong
(74) *Attorney, Agent, or Firm*—Law Offices of Albert S. Michalik, PLLC

(57) ABSTRACT

A method and system for storing the data of files having duplicate content, by maintaining a single instance of the data, and providing logically separate links to the single instance. Files of duplicate content have their data stored in a common store file by a single instance store (SIS) facility, which also converts the original file or files to links to that common store file and creates additional links thereto as needed. The SIS facility may reside above a file system as a filter driver. File system requests directed to the link file (e.g., open, write, read, close and delete) reach the SIS filter, which then transparently handles each request as if the link file was a normal file. To preserve logical separation, writes to a SIS link file are to the link file, and the written portion recorded as dirty. The SIS filter intercepts SIS read requests, and reads clean portions from the common store file and any dirty portions from the link file. When the link file is closed, the common store file also may be closed, and, if the link file has been written, the non-dirtied portions of the link file are filled in with clean data from the common store file, and the link file reconverted to a normal file. Security is provided to prevent unauthorized access to the common store files, as is a volume check facility that repairs any inconsistencies in SIS metadata.

75 Claims, 16 Drawing Sheets

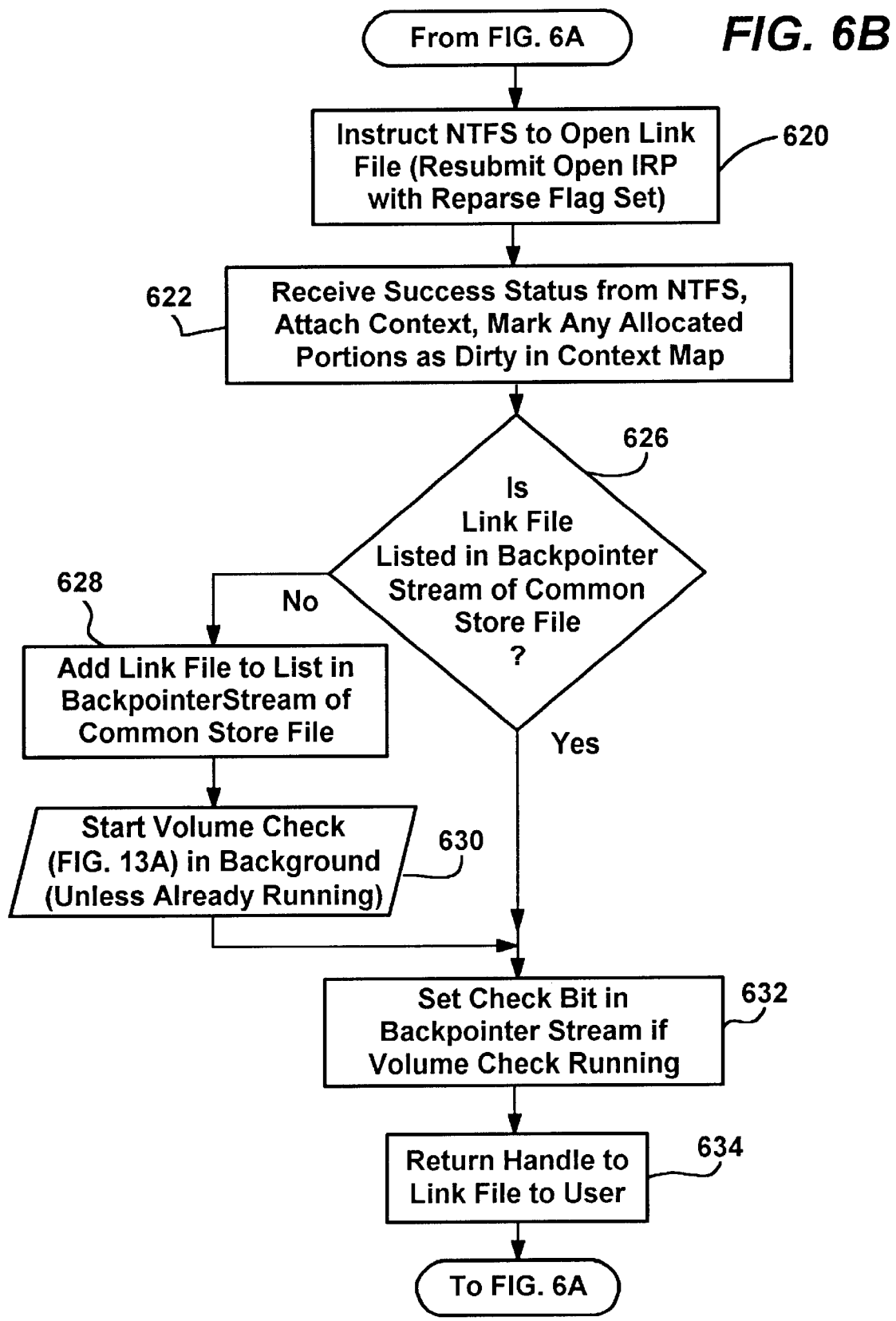

SINGLE INSTANCE STORE FOR FILE SYSTEMS

TECHNICAL FIELD

The invention relates generally to computer systems and data storage, and more particularly to a more efficient way to store files of a file system.

BACKGROUND OF THE INVENTION

The contents of a file of a file system may be identical to the contents stored in one or more other files. While some file duplication tends to occur on even an individual user's personal computer, duplication is particularly prevalent on networks set up with a server that centrally stores the contents of multiple personal computers. For example, with a remote boot facility on a computer network, each user boots from that user's private directory on a file server. Each private directory thus ordinarily includes a number of files that are identical to files on other users' directories. As can be readily appreciated, storing the private directories on traditional file systems consumes a great deal of disk and server file buffer cache space.

Techniques that have been used to reduce the amount of used storage space include linked-file or shared memory techniques, essentially storing the data only once. However, when these techniques are used in a file system, the files are not treated as logically separate files by the linked-file or shared memory techniques. For example, if one user makes a change to a linked-file, or if the contents of the shared memory change, every other user linked to that file or using the shared memory sees the change. This is a significant drawback in a dynamic environment where files do change, even if not very frequently. For example, in many enterprises, different users need to maintain different versions of files at different times, including traditionally read-only files such as applications. As a result, linked-file or shared memory techniques would work well for files that are strictly read-only, but these techniques fail to provide the flexibility needed in a dynamic environment.

One general concept that has been employed in virtual memory and database messaging systems to reduce the amount of duplicated data stored is known as a "Copy-on-Write" technique. With the Copy-on-Write technique, at the time of a requested copy, a link between a source and destination is established, but the copy is not made. Instead, the actual copying of the data is postponed and takes place only if and when either the source or destination is modified. For example, in virtual memory Copy-On-Write, processes send messages to one another with copy semantics, using the virtual memory system to map the same memory into the address space of both processes. If a process subsequently writes into the memory, a protection fault occurs, and the system makes a copy of the page in question and maps the newly copied page into the address space of the faulting process. Copy-on-write is useful when modification is expected to be a relatively rare occurrence, wherein the extra cost associated with detecting and carrying out the delayed copy operation is outweighed by the savings achieved by not having to make a copy most of the time. For example, in the database Copy-On-Write, only one copy of a mail message is maintained for a message sent to multiple users. A copy is made only if one of the recipients modifies the original mail message, a relatively rare occurrence.

Unlike the linked-file or shared memory techniques, the Copy-On-Write concept thus preserves the logical separation of modified data. While this works well for virtual memory and database messaging systems, file systems have a number of complexities that are not addressed by these prior Copy-On-Write techniques. For example, unlike raw data, files are renamed, deleted, and may be opened and closed by multiple users at different times. Many files also have security issues that need to be addressed. Moreover, unlike mail messages, there are many different types of files in a file system, and not all files in the file system are good candidates for copy-on-write, such as frequently changed application data files. Detecting and carrying out delayed copying for those types of files in a file system would be costly and wasteful. In short, there has heretofore not been any way in which to represent duplicate file system data as a single instance thereof, while maintaining a logical distinction between the user files corresponding to that single instance of data, so that the semantics of private files are preserved.

SUMMARY OF THE INVENTION

Briefly, the present invention provides a system and method for storing the data of files having duplicate data by maintaining a single instance of the data, and providing logically separate links to the single instance of the data representing each file in place of the file. The present invention thus manages a single copy of identical files, while maintaining the semantics of having separate normal files.

To accomplish the single instance store (SIS) of the present invention, a normal source file is converted to a link (file) to a common store file, such as by direct user request. A common store file is a file owned by SIS (rather than by a user) that is used to contain the data from the files represented by SIS links. Logically separate links to the same common store file may be created for files having duplicate content. The SIS facility may reside above the Windows® 2000/NT® file system (NTFS) as a filter driver, while the link file may be a sparse file including a reparse point identified by a SIS tag. SIS operates transparently, in that each file system request directed to the link file (e.g., open, write, read, close, delete, and so on) ultimately reaches the SIS filter, which then handles the request as if the link file was a normal file. For example, a file open request opens both the link file and the common store file (if not already open via another link). Writes to a SIS link file are written to the link file, and the SIS filter records the written portion of the file as dirty, thus preserving the logical separation of link files from one another. Read requests are intercepted by the SIS filter, which then reads clean portions from the common store file and any dirty portions from the link file. When the file is closed, the link file and the common store file are closed (unless the common store file is open via another link file). In the event that the link file has been written, then the sparse portions of the link file are filled in with clean data from the common store file, and the link file reconverted to a normal file.

The common store file maintains a backpointer identifying each link file that points to it. When a link file is reconverted to a normal file, (i.e., it was written to and then closed), the backpointer is removed from the common store file. Also, when a link file is deleted, the backpointer at its common store file is deleted. When no backpointers remain in a common store file, the common store file is deleted, since it is no longer needed to store the data for a link file.

The present invention provides security via a special signature to prevent unauthorized access to the common store files. A volume check facility that repairs inconsistencies in SIS metadata is also provided. In the volume check facility, the backpointers of each common store file are checked against the links in the file system, and the backpointers or links repaired as necessary.

Other advantages will become apparent from the following detailed description when taken in conjunction with the drawings, in which:

BRIEF DESCRIPTION OF THE DRAWINGS

FIGS. 6A–6B comprise a flow diagram generally representing the steps taken by the SIS facility to handle the open request represented in FIG. 5;

DETAILED DESCRIPTION OF THE INVENTION

Exemplary Operating Environment

Figure 1:
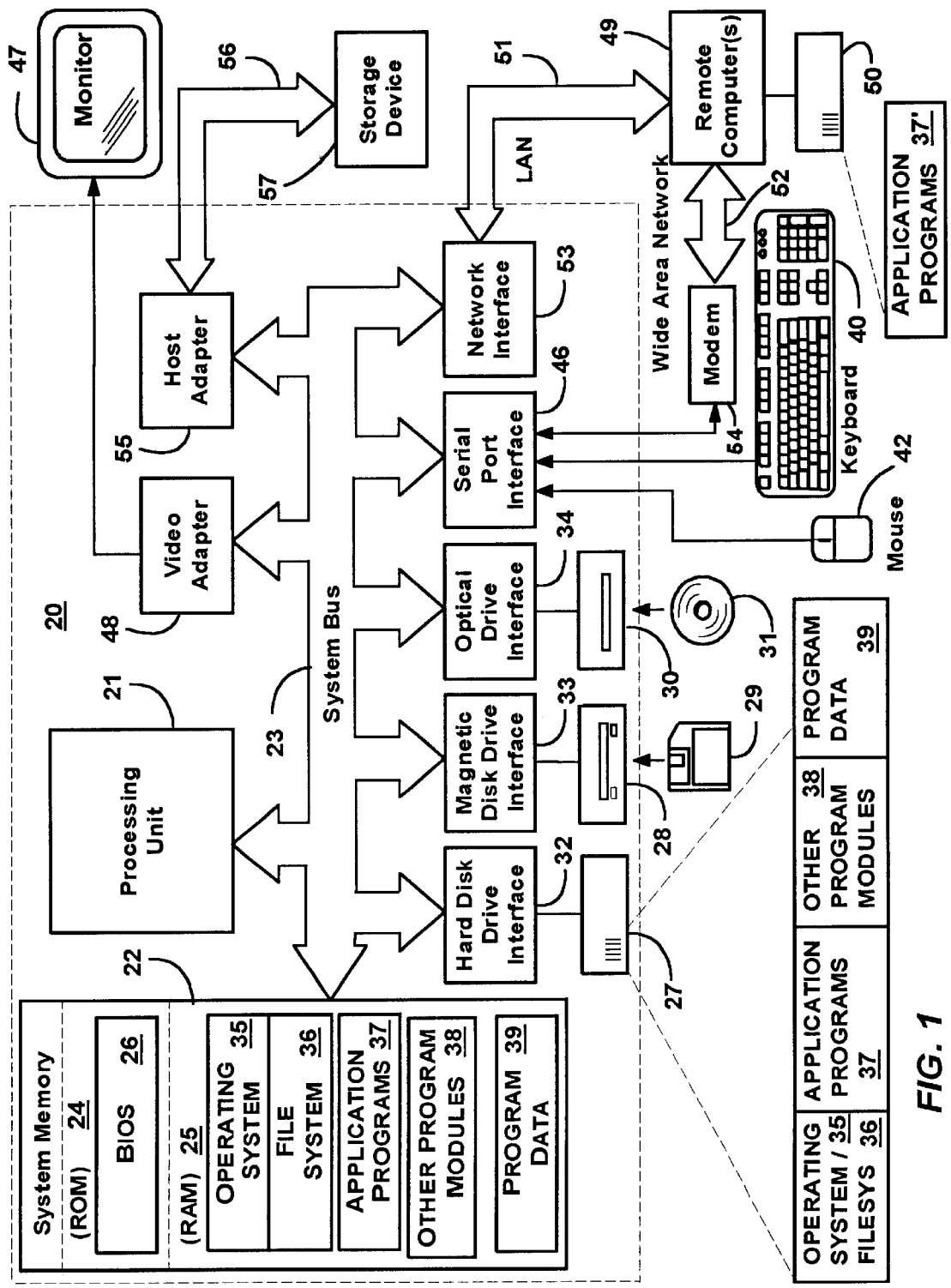
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is described herein with reference to Microsoft Corporation's Windows 2000 (formerly Windows NT®) operating system, and in particular to the Windows NT® file system (NTFS). Notwithstanding, there is no intention to limit the present invention to Windows® 2000, Windows NT® or NTFS, but on the contrary, the present invention is intended to operate with and provide benefits with any operating system, architecture and/or file system that needs to store duplicated data.

SINGLE INSTANCE STORE

Figure 2A:
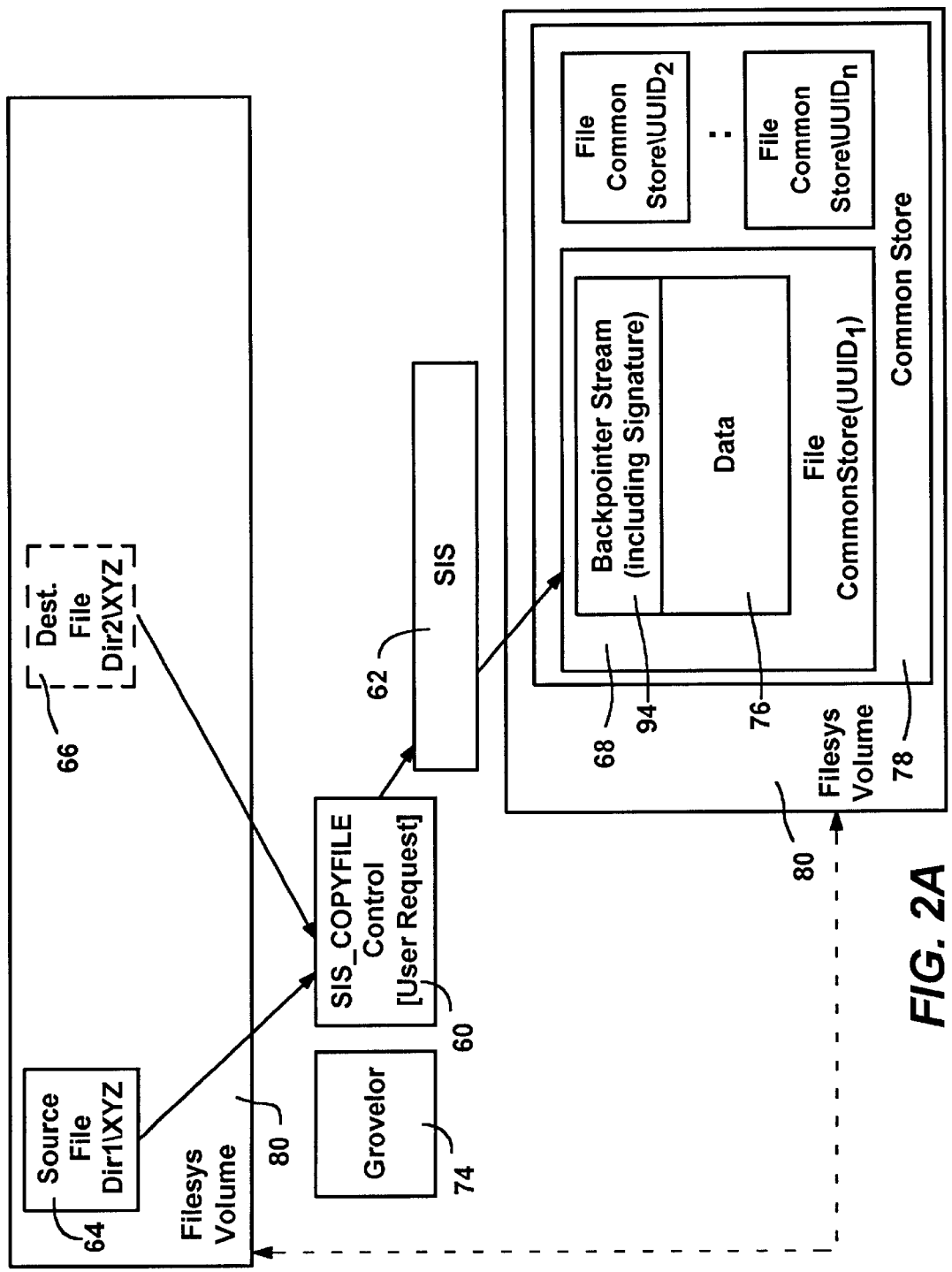
FIGS. 2A–2B are block diagrams representing the copying of a source file to a single instance store (SIS) link file and SIS common store file over time in accordance with an aspect of the present invention.
Figure 2B:
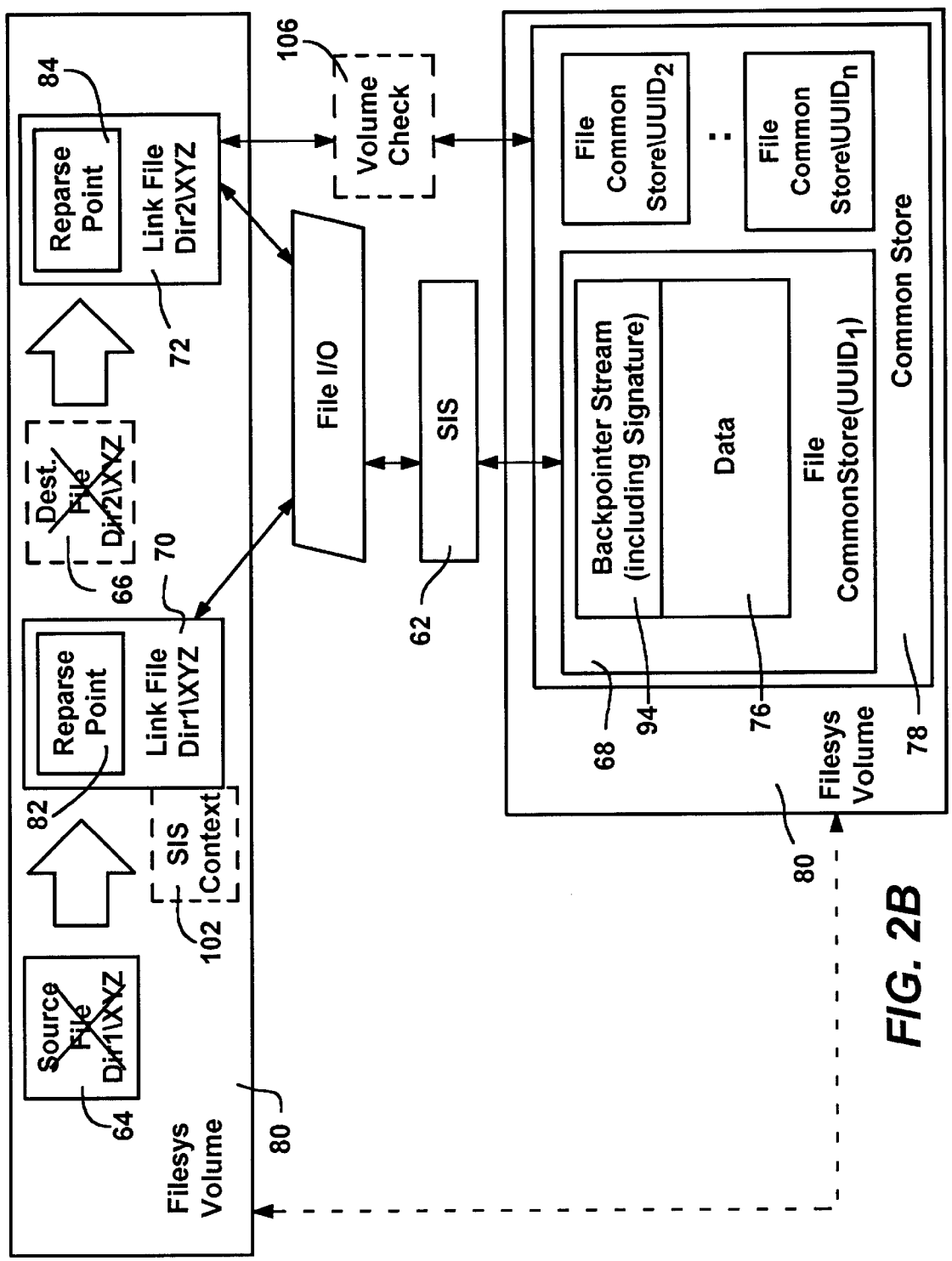

Turning now to FIGS. 2A–2B, there is shown the general concept of the single instance store (SIS) facility and architecture of the present invention, which may be implemented in the computer system 20. In FIG. 2A, a user, via a SIS copy file request 60 to a SIS facility 62, may explicitly request that a source file 64 be copied to a destination file 66 as a SIS copy of the file. Note that the destination file 66 ordinarily does not exist at this time, and is thus represented in FIGS. 2A and 2B by a dashed box. The preferred copy file request 60 may be implemented as a Windows 2000 file system control named SIS_COPYFILE, recognized by the SIS facility 62. As described in detail below, the SIS_COPYFILE request 60 to the SIS facility 62 normally results in a single instance representation of the original source file data with links thereto, each link corresponding to the source and destination files, respectively. Repeating the process as desired adds links without (substantially) adding to the single copy of the file. In this manner, for example, an administrator user of a file server may place the links for many client users on each user's private directory, while maintaining only one instance of the file on the server. Note that the user need not specify source and destination files, as it is feasible to have a SIS file with only one link thereto, while alternatively, a control may be implemented that allows more than two files to be specified for merging into a single instance representation thereof. It also may occur that the user requests that a SIS file be made from a file that is not a SIS link file but already has a single instance representation thereof. In such an instance, similar to the destination file, the non-SIS link source file may be converted (described below) by the SIS_COPYFILE control to a link to the existing single instance.

As an alternative to the manual SIS copy file operation 60, a user level process that seeks identical files may run (e.g., as a background process) to automatically request merging identical files into a single instance store file. The preferred user level process, known as a "groveler" 74 (FIG. 2A), uses a file system control named SIS_MERGE_FILES as described in copending United States patent application entitled "Method and System for Automatically Merging Files Into a Single Instance Store," assigned to the assignee of the present invention, filed concurrently herewith, and hereby incorporated by reference herein in its entirety. In general, after locating identical files, (possibly only those exceeding some threshold size), the result of the automatic actions taken by the groveler 74 with respect to the SIS_MERGE_FILES control provide a similar result to the manual SIS_COPYFILE actions taken by the user, and thus for purposes of simplicity, the groveler actions are not separately described herein in detail.

In accordance with one aspect of the present invention, FIG. 2B shows the result of the SIS_COPYFILE control. In FIG. 2B, the source and destination files are SIS link files 70, 72, while the single instance representation, including the file data 76, is maintained as a common store file 68 in a common store 78. Each SIS link file 70, 72 is a user file that is managed by the SIS facility 62, while the common store 78 is preferably a file system directory that is not intended to be visible or accessible to users. The link files 70, 72 are preferably on the same file system volume 80, as is the common store directory 78. Note that the single instance representation need not actually be a file system file in a common store directory, but may be stored in some other data structure. Thus, as used herein, the terms common store file and/or single instance file are intended to mean any appropriate data structure that can hold at least part of a file's contents.

Figure 5:
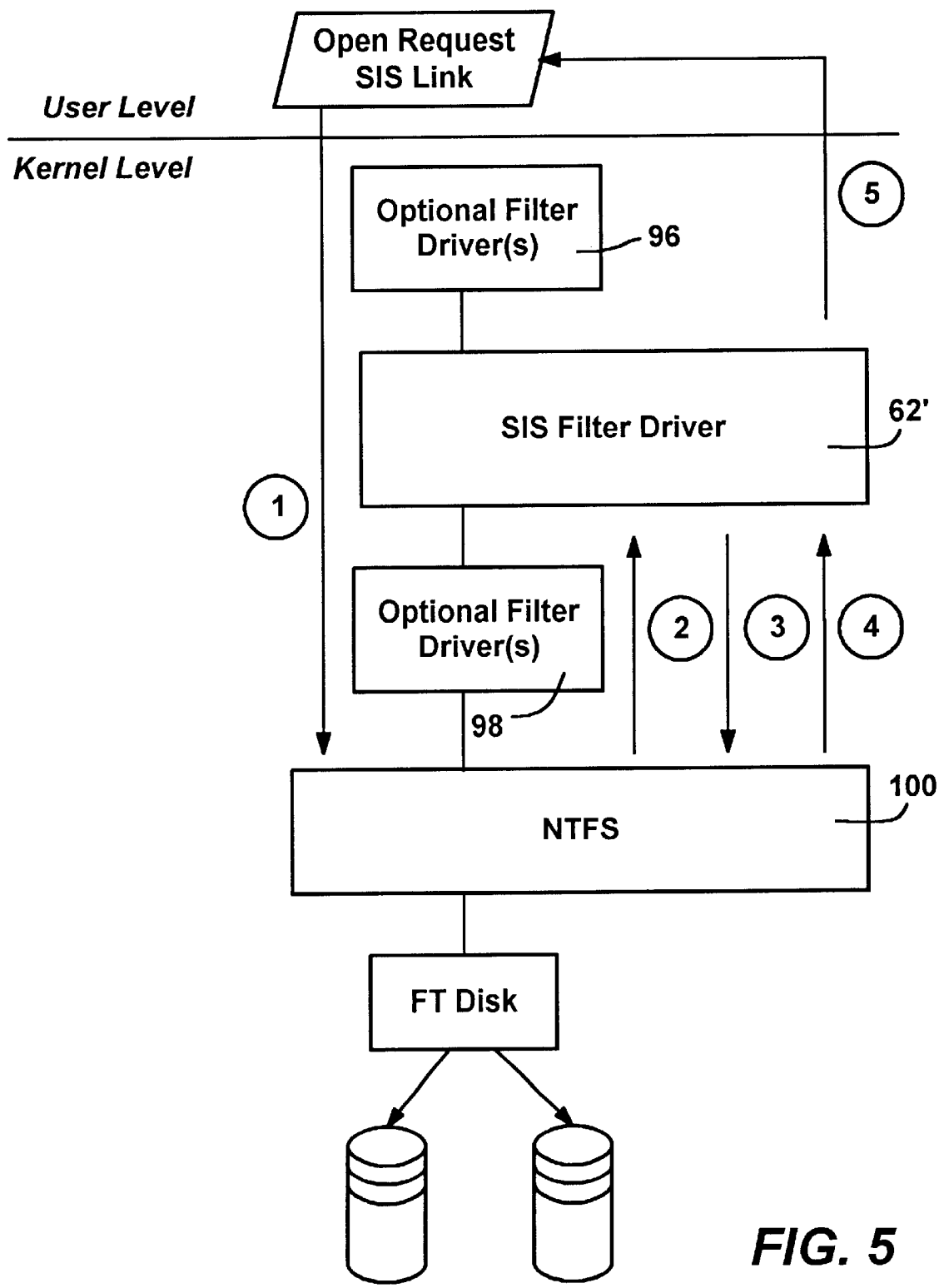
FIG. 5 is a representation of a SIS link file open request passing through a preferred SIS and file system architecture in accordance with an aspect of the present invention.

For efficiency, the SIS facility 62 may be built into the file system. However, although not necessary to the present invention, primarily for flexibility and to reduce complexity it is preferable in the Windows 2000 environment to implement the SIS facility 62 as a filter driver 62' (FIG. 5). Indeed, the present invention was implemented without changing the Windows NT® file system (NTFS). Notwithstanding, it will be understood that the present invention is not limited to the NTFS filter driver model.

In the NTFS environment, filter drivers are independent, loadable drivers through which file system I/O (input/output) request packets (IRPs) are passed. Each IRP corresponds to a request to perform a specific file system operation, such as read, write, open, close or delete, along with information related to that request, e.g., identifying the file data to read. A filter driver may perform actions to an IRP as it passes therethrough, including modifying the IRP's data, aborting its completion and/or changing its returned completion status.

In keeping with the invention, the SIS link files 70–72 do not include the original file data, thereby reclaiming disk space. More particularly, the link files are NTFS sparse files, which are files that generally appear to be normal files but do not have the entire amount of physical disk space allocated therefor, and may be extended without reserving disk space to handle the extension. Reads to unallocated regions of sparse files return zeros, while writes cause physical space to be allocated. Regions may be deallocated using an I/O control call, subject to granularity restrictions. Another I/O control call returns a description of the allocated and unallocated regions of the file.

Figure 3:
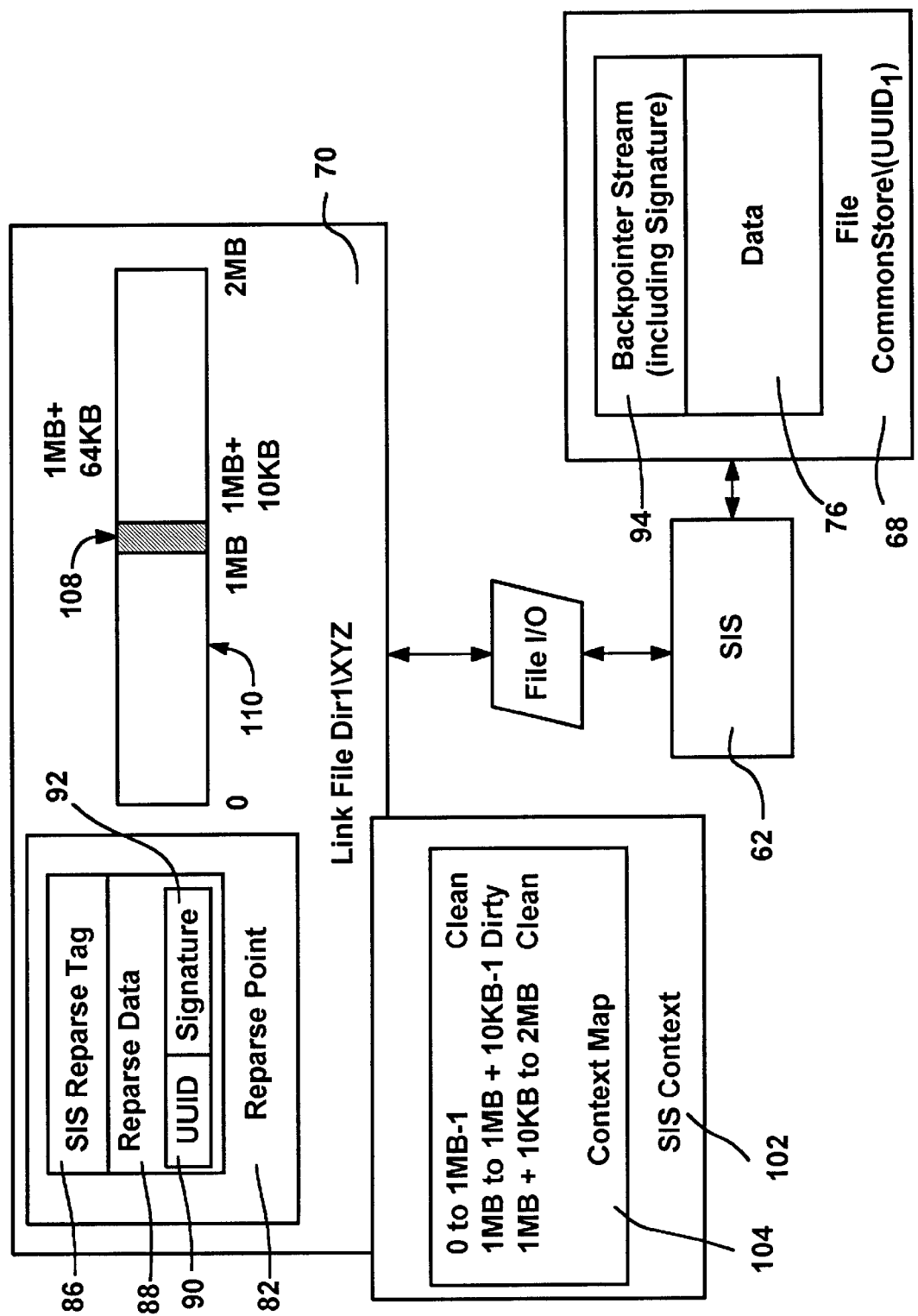
FIG. 3 is block diagram representing various components of a SIS link file and SIS common store file in accordance with an aspect of the present invention.

The link files 70, 72 include a relatively small amount of data in respective reparse points 82, 84, each reparse point being a generalization of a symbolic link added to a file via an I/O control call. As generally shown in FIG. 3, a reparse point (e.g., 82) includes a tag 86 and reparse data 88. The tag is a thirty-two bit number identifying the type of reparse point, i.e., SIS. The reparse data 88 is a variable-length block of data defined by and specific to the facility that uses the reparse point, i.e., SIS-specific data, as described below.

Figure 4:
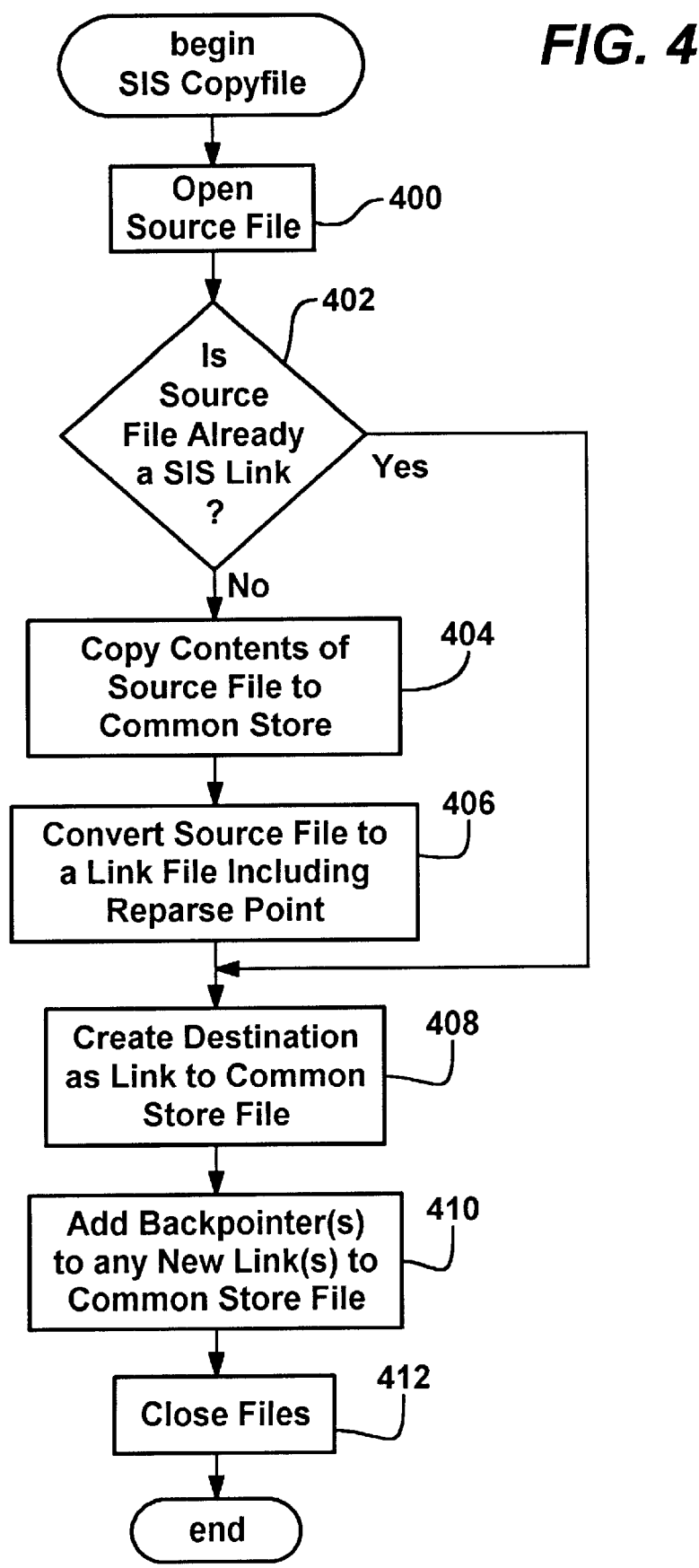
FIG. 4 is a flow diagram generally representing the steps taken when copying a source file to a SIS link file and SIS common store file in accordance with an aspect of the present invention.

FIG. 4 represents the general flow of operation when a user makes a SIS_COPYFILE control request 60 to SIS copy a source file 64 to a destination file 66 via the SIS driver 62'. The SIS driver 62' receives such requests, and at step 400 first opens the source file 64 to determine whether the file is already a SIS link file by looking for the existence of the SIS reparse point. Note that the user generally does not know whether a file is a SIS link or a regular file. If the source file 64 is already a SIS link, step 402 branches ahead to step 408, described below. Conversely, if the source file 64 is not a SIS link, step 402 branches to step 404 where the contents of the source file 64 are copied as file data 76 to a newly allocated file in the common store 78, i.e., the SIS common store file 68 (FIG. 2A). Note that for efficiency, SIS may employ some threshold test before making the copy, e.g., do not allow the SIS_COPYFILE operation on files less than one kilobyte in size. Further, note that SIS_COPYFILE does an actual copy of the contents of the source file to the common store 78 rather than a rename of the source file 64. The link file 70 thus maintains the file identifier (File ID) number originally assigned by the NTFS to the source file 64, so that user open requests directed to the NTFS file ID are to the link file 70 rather than to the common store file 68. This file ID number is used by SIS to identify the file, whereby any user-renaming of the link file by the user is not an issue. In an alternate embodiment, SIS could use rename in order to avoid copying the file data, possibly at the cost of having the source file's file ID change because of the copy operation.

The common store file 68, in the common store 78, is named based upon a 128-bit universal unique identifier (UUID), shown in FIGS. 2A–2B as the file CommonStore\(UUID$_1$). Using a UUID is particularly beneficial when backing up and restoring SIS files, since files with the same UUIDs are known to be exact copies, and more than one such copy is not needed in the common store 78. The backing up and restoring of SIS links and common store files is described in copending United States patent application entitled "Method and System for Backing Up and Restoring Files Stored in a Single Instance Store," assigned to the assignee of the present invention, filed concurrently herewith, and hereby incorporated by reference herein in its entirety.

While not shown in FIG. 4, if a copying error occurs, the source file 64 remains unchanged, an appropriate error message is returned to the requesting user, and the SIS_COPYFILE control 60 is terminated. In the normal event where there are no errors in the copying process, step 404 continues to step 406 where the source file 64 is converted to the SIS link file 70 (FIG. 2B).

To convert the source file 64 to the SIS link file 70 at step 406, the SIS_COPYFILE control 60 provides the reparse point 82, including the SIS tag 86, and reparse data 88 including the common store file's unique file identifier 90 and a signature 92 (FIG. 3). The signature 92 is a 64-bit checksum computed by applying a trinomial hash function (known as the 131-hash) to the file data 74. The common store file 68 maintains the signature therewith as part of a backpointer stream 94, described below. The only way to determine the signature is via the file data contents, and thus may be used to provide security by preventing unauthorized access to the contents via non-SIS created reparse points as described below.

As another part of the conversion to a link file 70 at step 406, the data of the file is cleared out using the aforementioned NTFS sparse file technology. The resulting link file 70 thus essentially comprises the reparse point 82 and a shell for the data. At step 408, the destination link file 72 is created in the same general manner, i.e., the link file 72 comprises a reparse point 84 having the same information therein and a shell for the data. Each link file is on the order of approximately 300 bytes in size.

Note that the creation of SIS files when the SIS groveler 74 recognizes identical files (SIS_MERGE_FILES) is similar to the SIS_COPYFILE control 60, except that the "destination" file initially exists and is identical to the "source" file. In general, if a single instance representation of those identical files already exists in the common store 78, the contents are not copied into the common store 78, and the identical, non-SIS files are converted to SIS link files as described above. The SIS_COPYFILE control 60 may similarly be extended when the source file is not already a SIS link, yet a single instance representation 68 of the file data is already in the common store 78, e.g., skip the copying at step 404, but not the conversion of the source file to a link file at step 406.

Step 410 represents the adding of identifiers of any new link files (via conversion, step 406 or creation, step 408) to the backpointer stream 94 maintained in the common store file. As described in more detail below, the backpointers identify to the common store file 68 the link files that point to it. As also described below, backpointers are particularly useful in delete operations, i.e., delete the backpointer when the link file is deleted, but only delete the common store file when it has no more backpointers listed in the stream 94. At this time, the common store file 68 and the links 70, 72 thereto are ready for use as SIS files, and the files are closed as appropriate (step 412).

Turning to FIGS. 5 and 6, there is provided an explanation of how a request to open a link file is handled by the SIS/NTFS architecture. As shown in FIG. 5, an open request in the form of an IRP, (including a file name of a file that has a SIS reparse point), as represented by the arrow with circled numeral one, comes in as a file I/O operation and is passed through a driver stack. The driver stack includes the SIS filter driver 62' with other optional filter drivers 96, 98 possibly above and/or below the SIS filter driver 62'. For purposes of the examples herein, these other filter drivers 96, 98 (shown herein for completeness) do not modify the IRPs with respect to SIS-related IRPs. At this time, the SIS filter driver 62' passes the IRP on without taking any action with respect thereto, as it is generally not possible to determine if a given filename corresponds to a file with a reparse point until NTFS processes the open request.

Figure 6A:
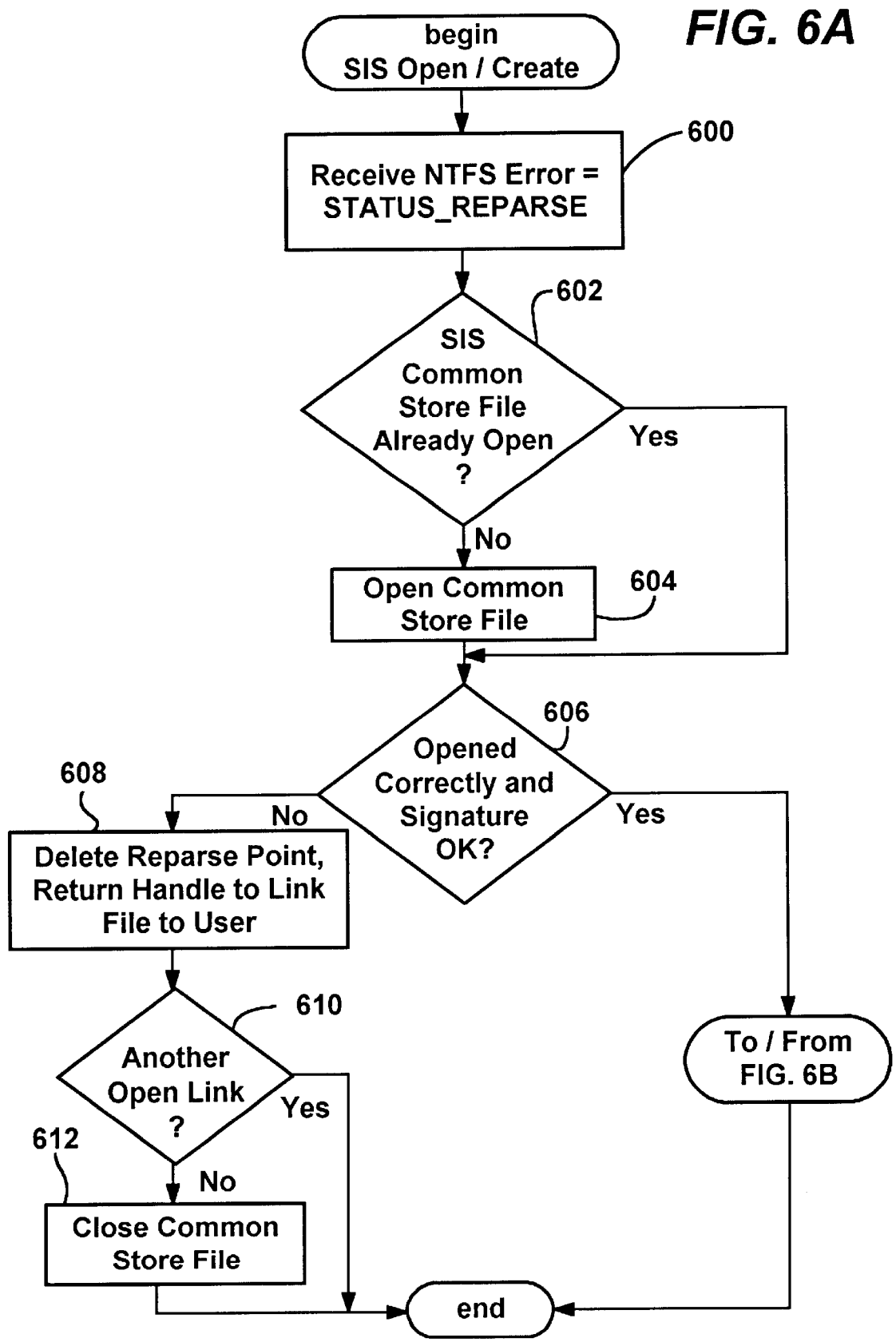

When the SIS link open IRP reaches the NTFS 100, the NTFS 100 recognizes that the file named in the IRP has a reparse point associated therewith. Without further instruction, the NTFS 100 does not open files with reparse points. Instead, the NTFS 100 returns the IRP with a STATUS_REPARSE completion error and with the contents of the reparse point attached, by sending the IRP back up the driver stack, as represented in FIG. 5A by the arrow with circled numeral two. As represented in FIG. 6A, at step 600 the SIS filter 62' receives the STATUS_REPARSE error and recognizes the IRP as having a SIS reparse point.

In response, via steps 602–604, the SIS filter 62' opens the common store file 68 identified in the reparse point if the common store file 68 is not already open, and reads the signature therein. This is accomplished by the SIS filter 62' sending separate IRPs to NTFS 100 identifying the common store file by its UUID name 90 (FIG. 3) in the reparse point 82, and then requesting a read of the appropriate data. Then, at step 606, if the open proceeded correctly, the SIS filter 62' compares the signature 92 in the reparse point with the signature in the backpointer stream 94 of the common store file 68. If they match, step 606 branches to step 620 of FIG. 6B as described below. However, if the signatures do not match, the SIS filter 62' allows the open to proceed by returning a file handle to the link file to the user, but without attaching SIS context to the opened file, essentially denying access to the common store file 68 for security reasons.

More particularly, a SIS reparse point may be generated external to SIS, including the UUID-based name of a common store file, a name which can be guessed in a relatively straightforward manner. As a result, without the signature check, such an externally-generated reparse point could give potentially unauthorized access to the common store file. However, since the SIS-reparse point has a signature, and the signature may only be computed by having access to the file data, only those who already have access to the file data can know the signature and provide a valid SIS-reparse point. The file data in the common store is thus as secure as the file data was in the original source file.

If the signature does not match at step 606, step 608 returns access to the link file without corresponding access to the common store file to the user. Step 610 then tests to see if another link file has the common store file open, and if not, step 612 closes the common store file 68. More particularly, SIS maintains a data object that represents the common store file, and the common store file data object keeps a reference count of open link files having a reference thereto. Step 610 essentially decrements the reference count and checks to see if it is zero to determine whether it needs to close the common store file handle. Note that valid users are thus not stopped from working with their valid links to the common store file 68 if an invalid reparse point is encountered during the valid users' sessions.

If the signatures match at step 606, at step 620 the SIS filter driver 62' sets a FILE_OPEN_REPARSE_POINT flag in the original link file open IRP, and returns the IRP to the NTFS 100, as shown in FIG. 5 by the arrow with circled numeral three. This flag essentially instructs the NTFS 100 to open the link file 70 despite the reparse point. As shown in FIG. 5 by the arrow with circled numeral four, the NTFS 100 returns success to the SIS filter 62' along with a file object having a handle thereto (assuming the open was successful). At step 622 of FIG. 6B, when the success is received, the SIS filter driver 62' attaches context 102 (FIG. 2B) to the file object, including a context map 104 (FIG. 3) that will be used to indicate any portions of the link file that have been allocated to data. Note that the context 102 is an in memory structure and only attached while the file is open, and is thus represented by a dashed box in FIG. 2B to reflect its transient nature. If the link file has any allocated data portions, those portions are marked in the map 104 in the context as "dirty" at step 622. A link file having allocated data when first opened is a special case situation that occurs, for example, when the disk volume 80 was full, as described below.

At step 626, a check is made to ensure that the link file's identifier is listed among the backpointers in the backpointer stream 94 of the common store file 68. It is possible for the list of backpointers in the stream 94 to become corrupted (e.g., when the SIS filter driver 62' is not installed) whereby the link file 70 is not listed. If not listed at step 626, the link file's identifier, which is known to identify a valid link, is added to the list of backpointers 94 at step 628, and a volume check procedure 106 (FIG. 2B) is started at step 630 (unless already running). The volume check 106 essentially works with the backpointer streams of the various common store files ($UUID_1$–$UUID_n$) so that common store files do not contain backpointers to link files that do not exist, so that common store files do not remain and use disk space without at least one link pointing thereto, and so that each valid link file has a backpointer in the corresponding common store file. At step 632, if volume check 106 is running, a check bit, used by the volume check 106, is set to one in the backpointer for the file each time that link file is opened. The volume check 106 and check bit are described below.

At step 634, the handle to the link file is returned to the user, shown in FIG. 5 by the arrow with circled numeral five. Note that the user thus works with the link file 70, and generally has no idea that the link file 70 links the file to the common store file 68. At this time, assuming the signature was correct and the opens were successful, the user has a handle to the link file 70 and the common store file 68 is open.

In accordance with one aspect of the present invention, writing to a SIS link file 70 does not change the common store file 68, since other links to the common store file 68 are logically separate. Instead, write requests are written to space allocated therefor in the link file 70, as described below. In this manner, changing the data via one link does not result in changes seen by the other links. Thus, by "logically separate" it is meant that in a SIS link, changes made to one link file are not seen by users of another link file, in contrast to simply having separate file names, protections, attributes and so on.

Figure 7:
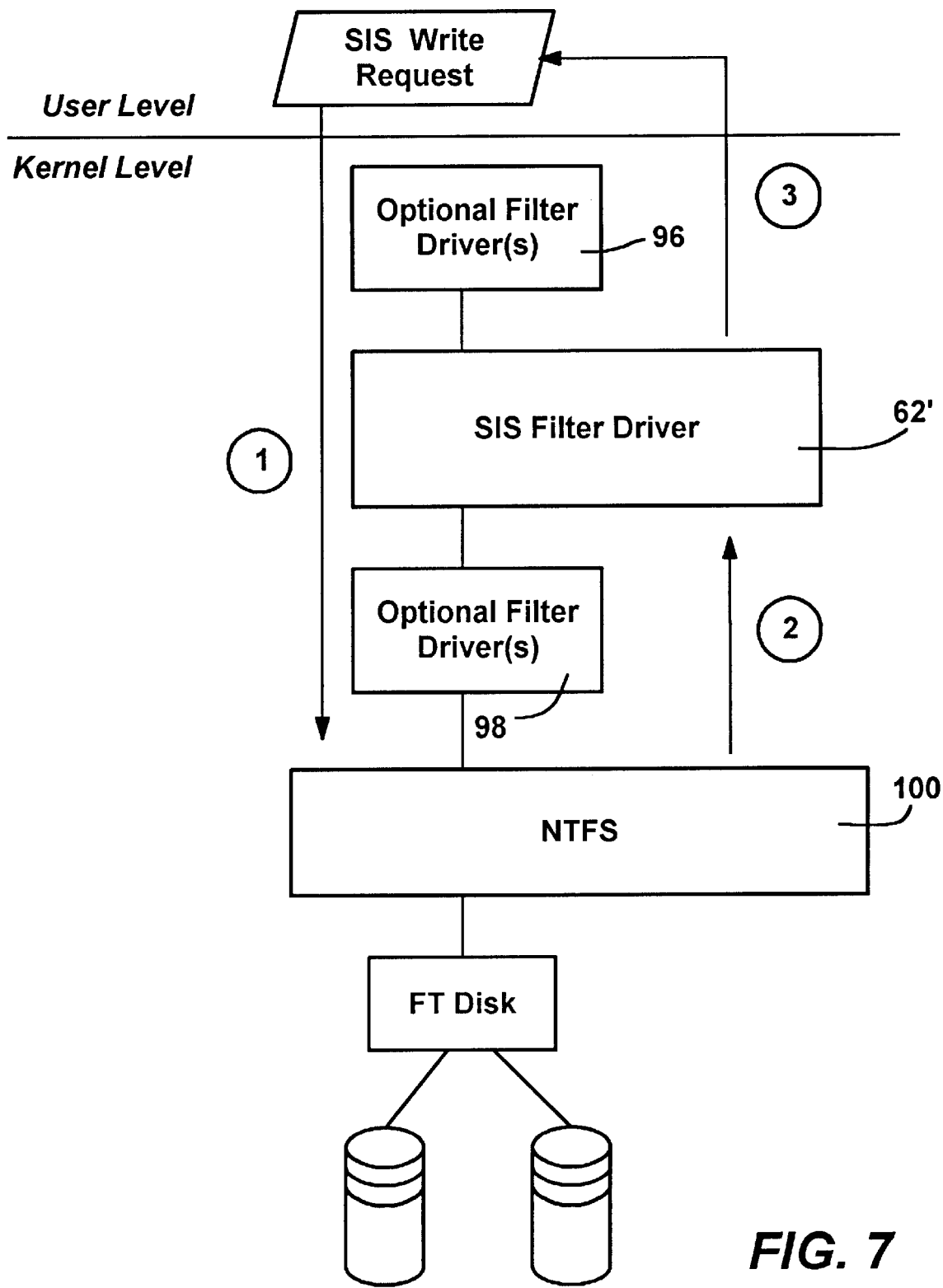
FIG. 7 is a representation of a SIS link file write request passing through a preferred SIS facility in accordance with an aspect of the present invention.
Figure 8:
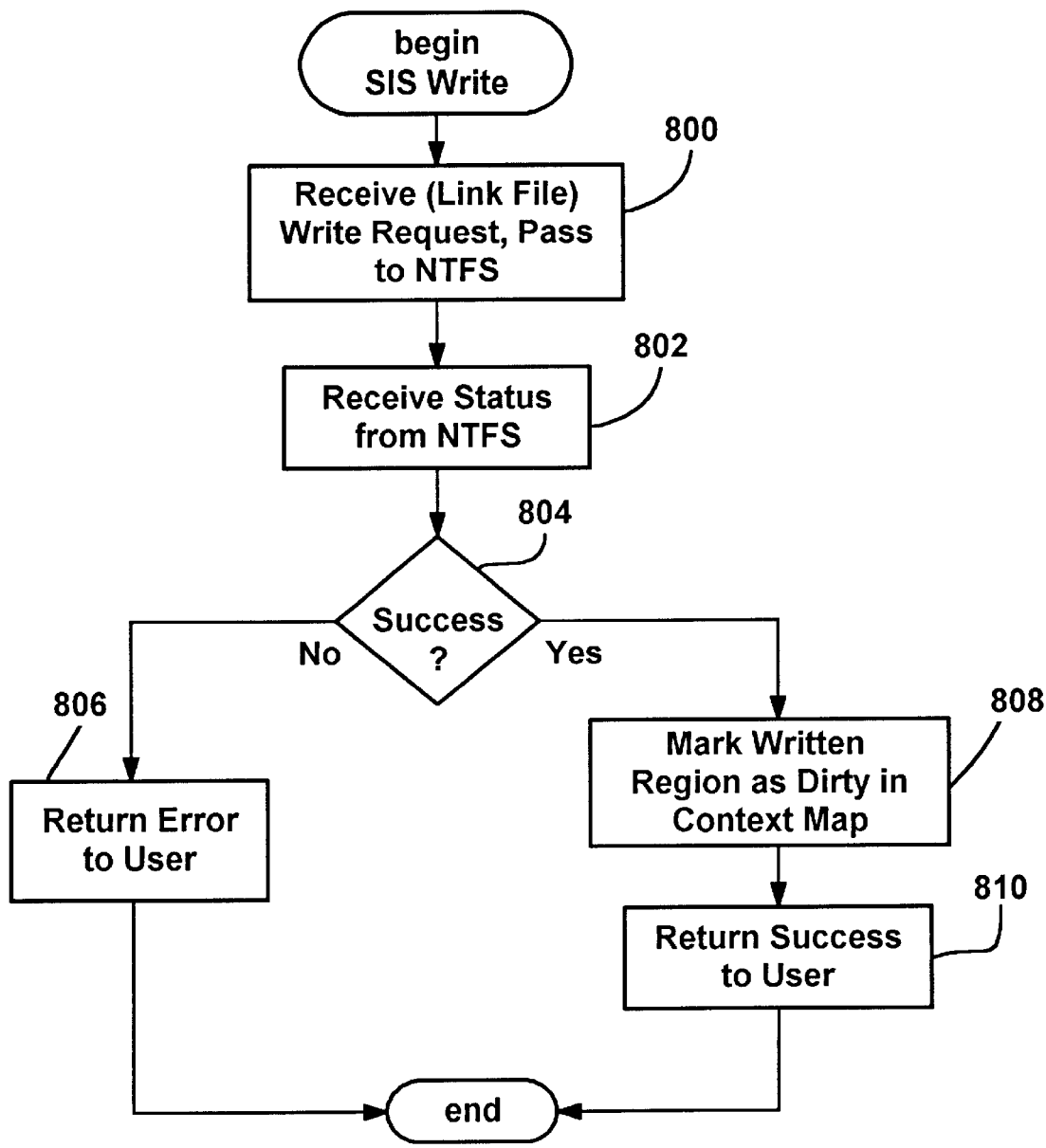
FIG. 8 is a flow diagram generally representing the steps taken by the SIS facility to handle the write request represented in FIG. 7.

FIGS. 7 and 8 describe how the SIS filter 62' handles a write request to the open link file 70. As shown in FIG. 7, the SIS write request comes through the driver stack to the SIS filter driver 62' as an IRP, including the file handle and attached context 102. The IRP designates the region of the file to be written and identifies the location of the data to write. The SIS filter driver 62' can recognize the context 102 as belonging to SIS, but because the write is directed to the link file 70, SIS lets the IRP pass to the NTFS 100 as shown in FIG. 7 by the arrow with circled numeral one and in FIG. 8 as step 800. NTFS attempts the write, allocating appropriate space in the link file 70, and SIS receives a status from the NTFS at step 802 (the arrow with circled numeral two in FIG. 7). If the write failed, e.g., the disk is full and the space could not be allocated, step 804 branches to step 806 where the error is returned to inform the user.

If the write was successful, step 804 branches to step 808 where the SIS filter driver 62' marks the region that was written as dirty in the context map 104 of the context 102, while step 810 then reports the successful write status to the user. In this manner, SIS tracks which part of the file data is current in the common store file 68 and which part is current in the link file 70. By way of example, consider a user requesting to write ten kilobytes of data beginning at offset one megabyte, as generally shown in FIG. 3. The NTFS 100 allocates the space, unless already allocated, in the appropriate region 108 of the link file's (sparse) data space 110 (note that the NTFS actually allocates space in 64-kilobyte blocks). SIS then marks the context map 104 to reflect this dirty region, as shown in FIG. 3. Note that since the changes are not written to the common store file 68, the changes written to one link file are not seen by any other link to the common store file 68.

SIS thus lets NTFS 100 handle the allocation of the space in the sparse file and the writing thereto. However, if SIS is implemented in a file system that did not have sparse file capabilities, SIS could perform the equivalent operation by intercepting the write request and writing the data to a temporary file. Upon closing the "changed" link file, SIS only need copy the clean data from the common store file to the temporary file, delete the link file and rename the temporary file with the name of the link file to achieve the logical separation of files in a transparent manner.

Figure 9:
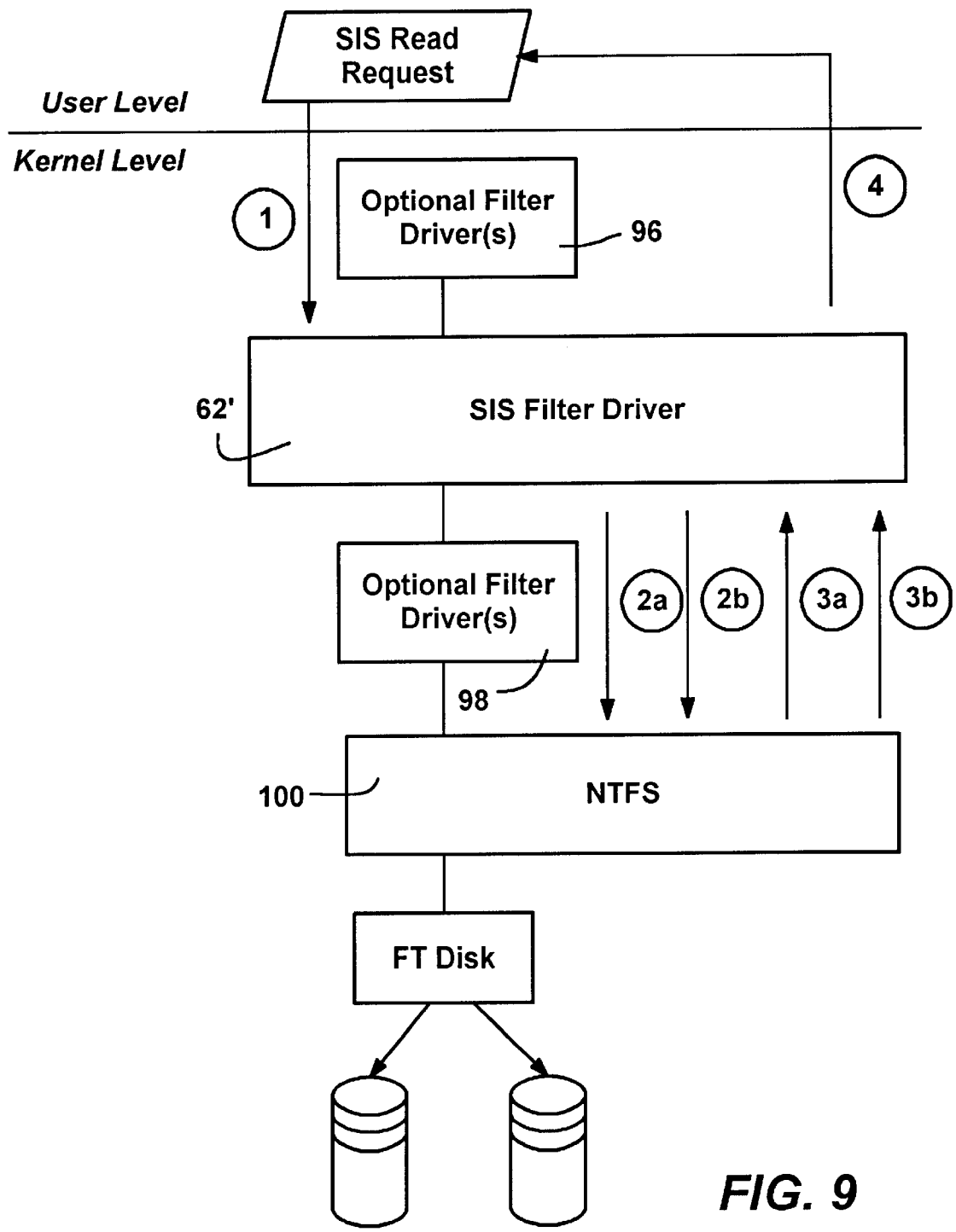
FIG. 9 is a representation of a SIS link file read request passing through a preferred SIS facility in accordance with an aspect of the present invention.
Figure 10:
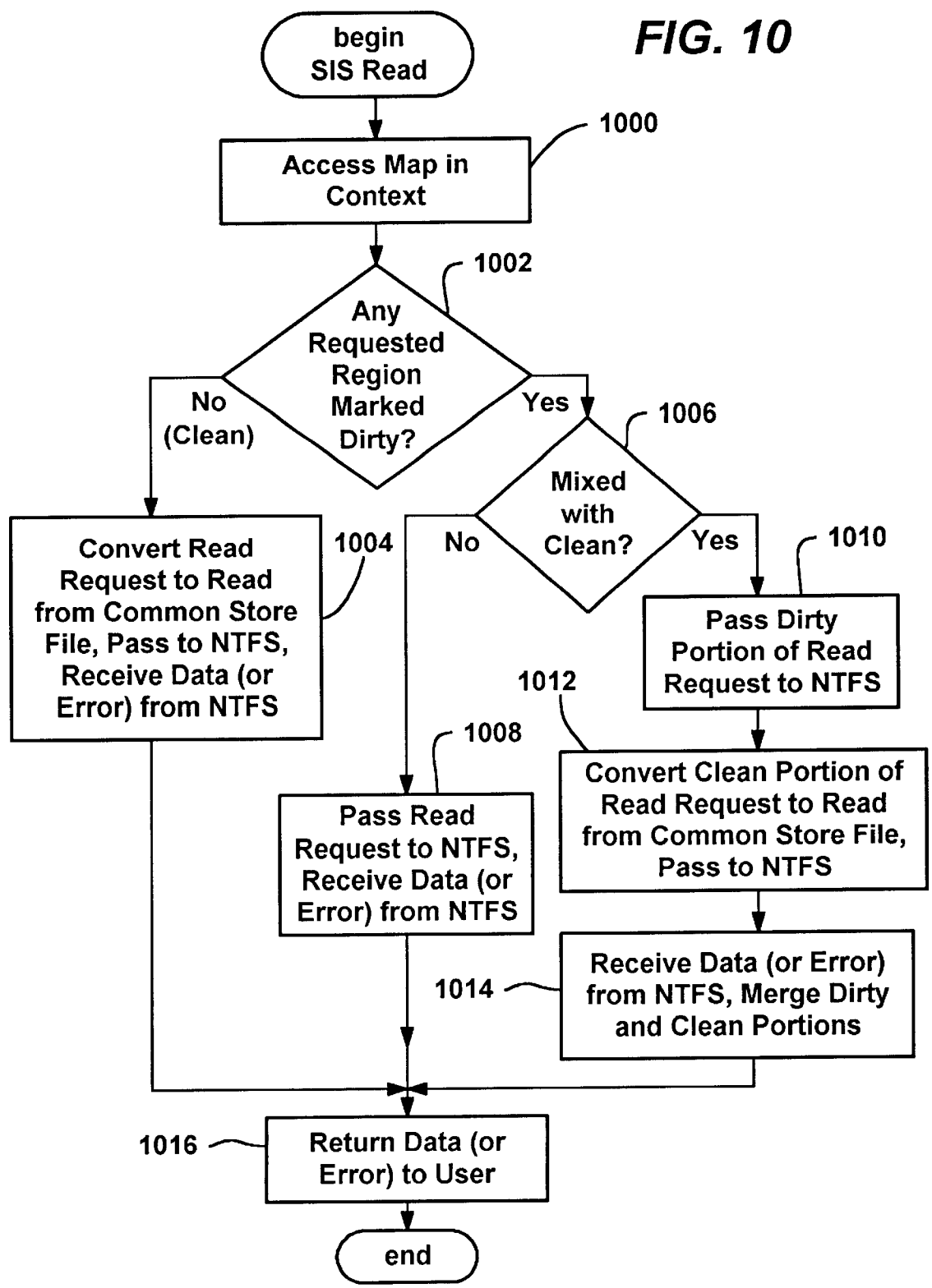
FIG. 10 is a flow diagram generally representing the steps taken by the SIS facility to handle the read request represented in FIG. 9.

FIGS. 9 and 10 describe how the SIS filter 62' handles a read request to the open link file 70. As shown in FIG. 9, the SIS read request comes through the driver stack to the SIS filter driver 62' as an IRP, including the file handle and attached context. The SIS filter driver 62' recognizes the attached context 102 as belonging to SIS, and intercepts the IRP, shown in FIG. 9 by the arrow with circled numeral one.

As shown in step 1000 of FIG. 10, the SIS filter driver initially examines the map 104 in the attached context 102 to determine if any of the link file is marked as dirty, i.e., allocated to file data. Step 1002 then compares the region that the IRP is specifying to read against the map 104, and if the read is to a clean region, step 1002 branches to step 1004. In accordance with one aspect of the present invention, SIS, via step 1004, converts the link file read request to a common store file read request IRP and passes the modified IRP to the NTFS 100 as also shown by the arrow accompanied by the circled numeral 2a in FIG. 9. The NTFS 100 responds with the to requested data (or an error) as shown in FIG. 9 by the arrow with circled numeral 3a. The data (or error) is then returned to the user at step 1016 of FIG. 10, (circled numeral 4 in FIG. 9). Note that to the user, the request appears to have been satisfied via a read to the link file, when in actuality the SIS filter 62' intercepted the request and converted it to a request to read from the common store file 68.

Returning to step 1002, it is possible that via a write operation to the link file, some of the data requested to be read is from a "dirty" region, that is, one that has been allocated and written to while the link file was open (or that was allocated on the disk when the link was first opened in step 622). As described above, write requests cause space to be allocated in the link file 70 to provide an actual region to maintain the current state of the changed data. At step 1002, if a requested region to read is marked as dirty, step 1002 branches to step 1006 to determine if the entire read is from a dirty region or spans both dirty and clean regions.

If the entire region is dirty, then the SIS filter 62' passes the read request IRP to the NTFS 100 whereby the link file 70 is read at step 1008 and returned to the SIS filter 62'. This is represented in FIG. 9 by the arrows designated with circled numerals 2b and 3b. The data (or error) is then returned to the user at step 1016 of FIG. 10, (circled numeral 4 in FIG. 9). In this manner, the user receives the current changes that have been written to the link file rather than the stale data in the common store file 68.

Alternatively, if step 1006 detects that the user is requesting both clean and dirty regions, the SIS filter 62' splits up the read request into appropriate requests to read the dirty region or regions from the link file 70 and the clean region or regions from the common store file 68. To this end, at steps 1010 and 1012, the SIS filter 62' uses the map 104 to generate one or more IRPs directed to reading the common store file 68 and passes at least one IRP directed to reading the link file 70 and at least one IRP directed to reading the common store file 68 to the NTFS 100. This is represented in FIG. 9 by arrows labeled with circled numerals 2a and 2b. Assuming no read errors, step 1014 merges the read results returned from the NTFS 100 (in FIG. 9, the arrows labeled with circled numerals 3a and 3b) into a single result returned to the user at step 1016 (the arrow labeled with circled numeral 4). Note that any read error will result in an error returned to the user, although of course SIS may first retry on an error. By appropriately returning the current data in response to a read request from either the common store file 68 or the link file 70, or both, SIS maintains the logical separation of the link files in a manner that is transparent to the requesting user.

Figure 11:
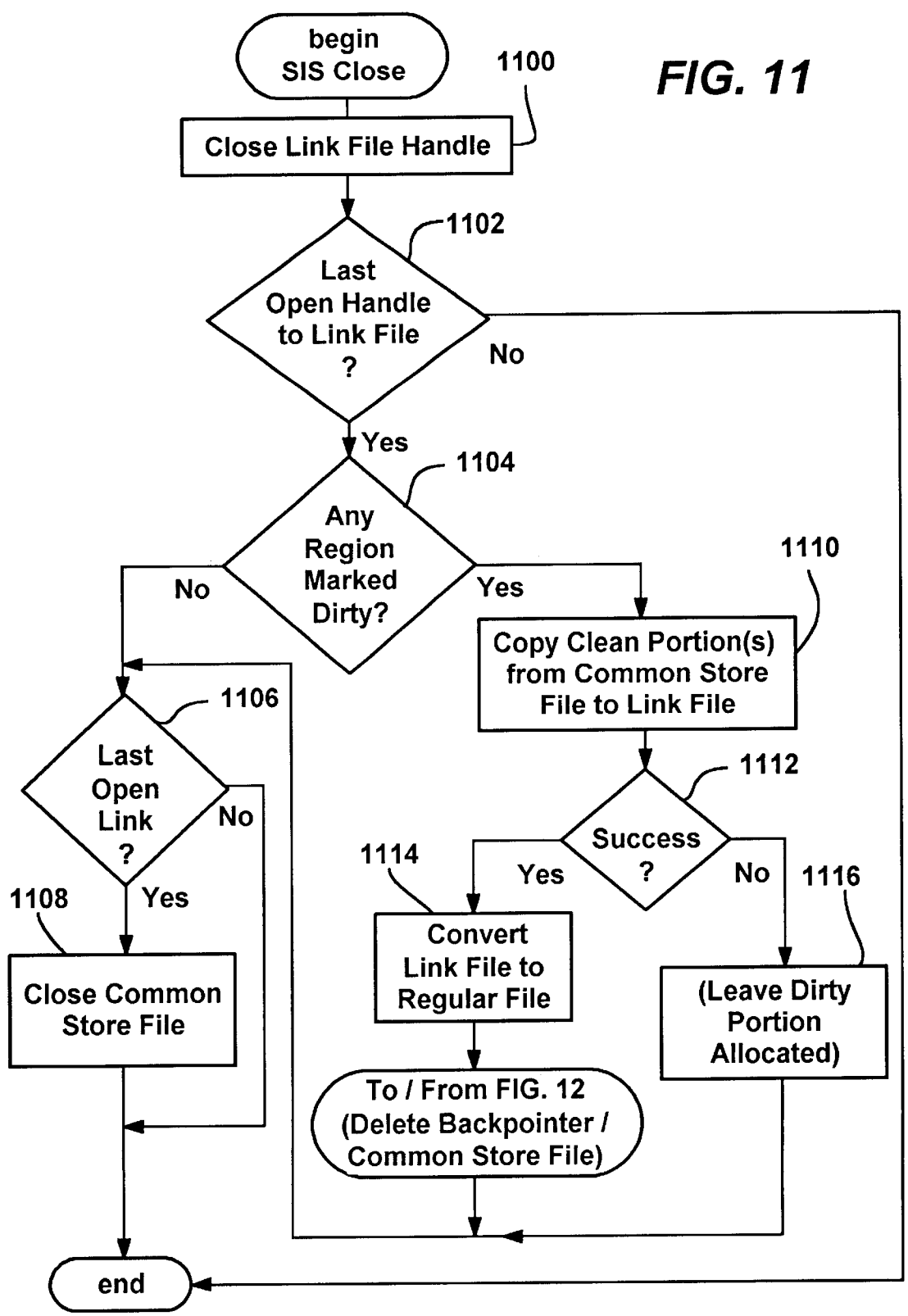
FIG. 11 is a flow diagram generally representing the steps taken by the SIS facility to handle a SIS link file close request in accordance with an aspect of the present invention.

FIG. 11 represents the steps taken when a request to close the handle to the link file 70 is received and the handle is closed at step 1100. At step 1102, a test is performed to see if this was the last handle currently open to this link file. If not, the process ends, whereby the link file is left open for operations via the other open file handles. If instead this was the last open handle, step 1104 makes a determination (via the context map 104) if any portion of the link file 70 is marked as dirty (allocated). If not, the driver 62' requests closing of the common store file handle, whereby steps 1106 and 1108 cause the common store file 68 to be closed if no other links have the common store file 68 open, otherwise the common store file 68 remains open for the other links to use. Conversely, at step 1104, if any region of the link file 70 was written to and is thus marked as dirty, step 1104 branches to step 1110 since the link file may no longer be properly represented by the common store file 68. Note that steps 1110 and below may take place after the link file handle has been closed, by doing the work in a special system context. This allows the users to access the SIS file while the copyout of clean data is in progress. Step 1110 copies the clean portions from the common store file 68 to space allocated therefor in the link file 70. If successful at step 1112, the now fully-allocated link file is converted back to a regular file 64 at step 1114, essentially by removing the reparse point. In this manner, logically independent links to the common store file are supported, as the changes made to one link file are not seen via any other link file. The link file 70 is then deleted from the list of files in the backpointer stream as described below with reference to FIG. 12, which may further result in the common store file being deleted. The process then continues to steps 1106 and 1108 to close the common store file if no other links have it open. Note that the handle to the common store file needs to be closed even if the common store file was deleted.

However, it is possible that the clean data from the common store file 68 could not be copied back, particularly if the space therefor could not be allocated in the link file 70 due to a disk full condition. If such an error occurs, step 1112 branches to step 1116 which represents the canceling of the copyout and leaving the link file 70 as is, preserving the written data. Note that this will not cause a disk full condition because the space was already allocated to the link file during the earlier write request without an error, otherwise the write request that caused the space to be allocated would have failed and the user notified (FIG. 8, steps 804–806). As described above, when the link file is re-opened, step 622 of FIG. 6B will mark the allocated portions of the link file 70 as dirty in the map 104, whereby the changes are properly returned when the file is read. Step 1116 then continues to steps 1106 and 1108 to close the common store file if no other links have it open.

In a similar manner to the disk full condition, it is thus possible in general to employ the SIS architecture to use the link file 70 to maintain changes (deltas), with the unchanged clean regions backed up by the common store file 68. To this end, instead of copying the clean portions from the common store file and reconverting the link file to a regular file when the file is closed, SIS may keep the link file as a link file with whatever space is allocated thereto. Some criteria also may be used to determine when it is better to convert the link file back to a regular file. For example, a threshold test as to the space saved may be employed to determine when to return a link file to a regular file versus keeping it as a link, whereby only link files with relatively small deltas would be maintained as link files. As a result, SIS may provide space savings with files that are not exact duplicates, particularly if the file contents are almost exactly identical. Notwithstanding, at present SIS preferably employs the copy-on-close technique of FIG. 11, since updates of SIS files and/or writes thereto are likely to be relatively rare.

Figure 12:
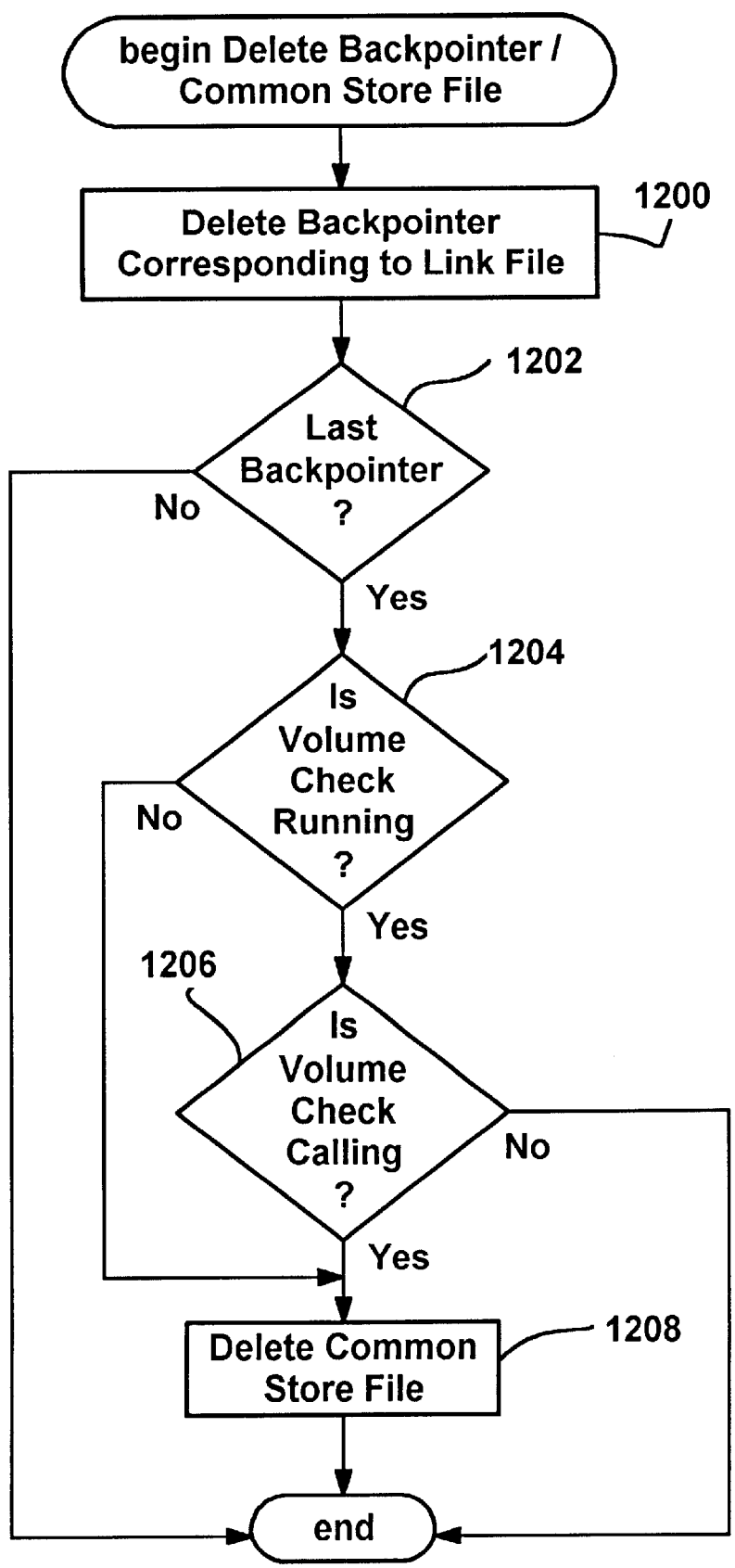
FIG. 12 is a flow diagram generally representing the steps taken by the SIS facility to handle a SIS link file delete request in accordance with an aspect of the present invention.

Turning to FIG. 12, there is shown a process employed by SIS after a link file is deleted (e.g., by file I/O) or reconverted to a regular file (e.g., by the SIS close process). When a SIS link is deleted or reconverted to a regular file, the common store file 68 corresponding to that SIS link file is not necessarily deleted because other links may be pointing to that common store file 68. Thus, at step 1202, the backpointer stream 94 is evaluated to determine if the deleted backpointer was the last backpointer remaining in the stream, i.e., there are no more backpointers. If it is not the last backpointer, then there is at least one other link file pointing to the common store file 68, the common store file 68 is thus still needed, and the process ends. In this manner, logically independent links to the common store file are again supported, as deleting one link file does not affect any other link file. Note that although not shown at step 1202, if the backpointer to be deleted is not found, the volume check 106 (FIG. 2B, and described below) may be started, if not already running.

If no backpointers remain at step 1202, this generally indicates that no link files are pointing to the common store file and thus the common store file is no longer needed. However, before deleting the common store file, step 1202 branches to step 1204 where a test is performed as to whether the volume check procedure 106 is running. If so, there is a possibility that the backpointer stream is corrupted, as described below. If the volume check is not currently running, step 1204 advances to step 1208 to delete the common store file (after first closing it, if necessary). Otherwise, since the backpointer stream is not necessarily trustworthy, step 1204 branches to step 1206 where it is determined whether the volume check 106 is calling this delete procedure, i.e., whether the steps of FIG. 12 are being invoked from FIG. 13B. If the volume check is not calling to delete the file, step 1206 ends the process without deleting the file, otherwise step 1206 branches to step 1208 to delete the file. Step 1206 thus enables the volume check 106 to delete a common store file when the volume check has concluded that the backpointer stream is correct and no link files point thereto.

In sum, step 1208 deletes the common store file when the backpointer stream is both empty and trusted, thereby reclaiming the disk space. Note that instead of backpointers, counts of the links may be alternatively used for this purpose, i.e., delete the common store file when a count of zero links thereto remain. Backpointers are preferable, however, primarily because they are more robust than counts, as described below with respect to the volume check 106.

Figure 13A:
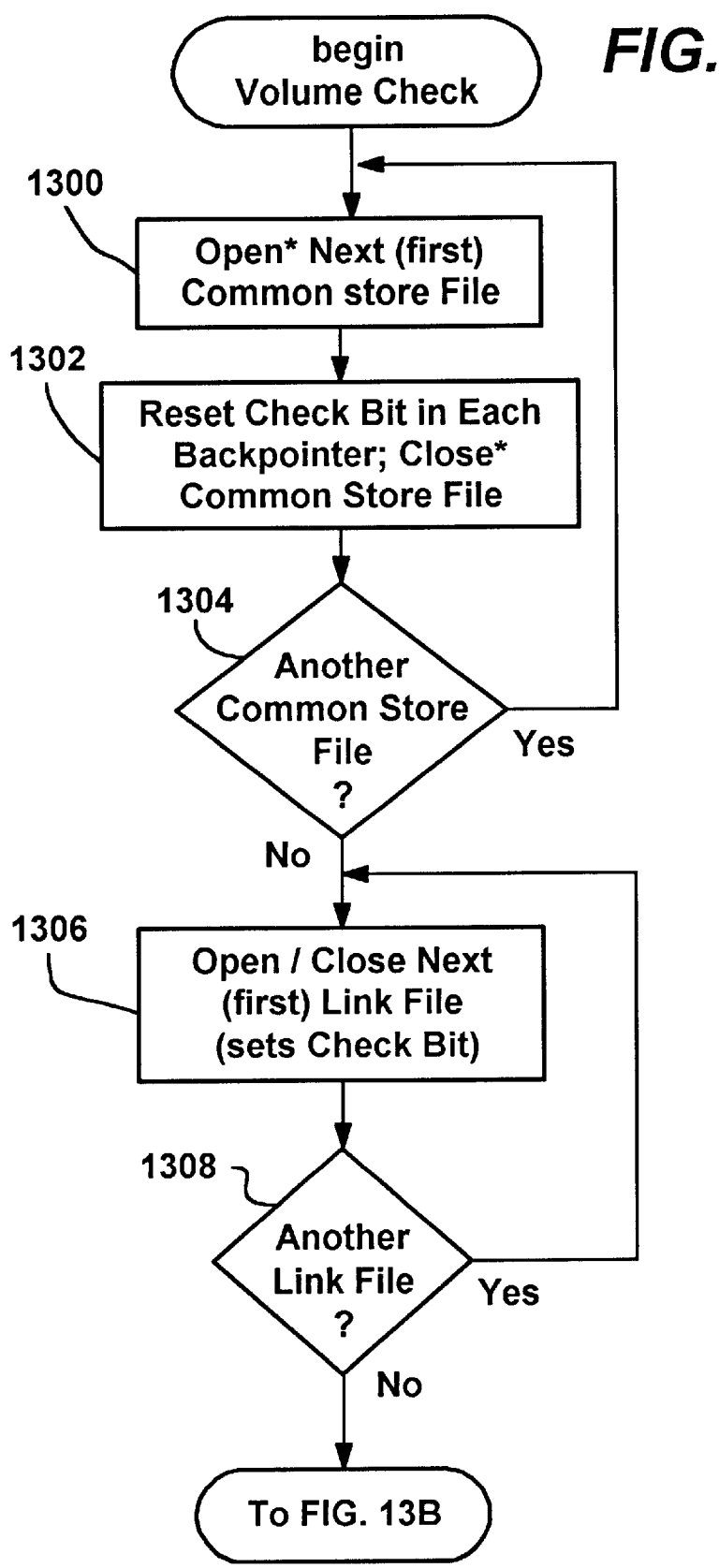
FIGS. 13A–13B comprise a flow diagram generally representing the steps taken by a SIS volume check facility for repairing inconsistencies in the metadata of SIS files in accordance with another aspect of the present invention.
Figure 13B:
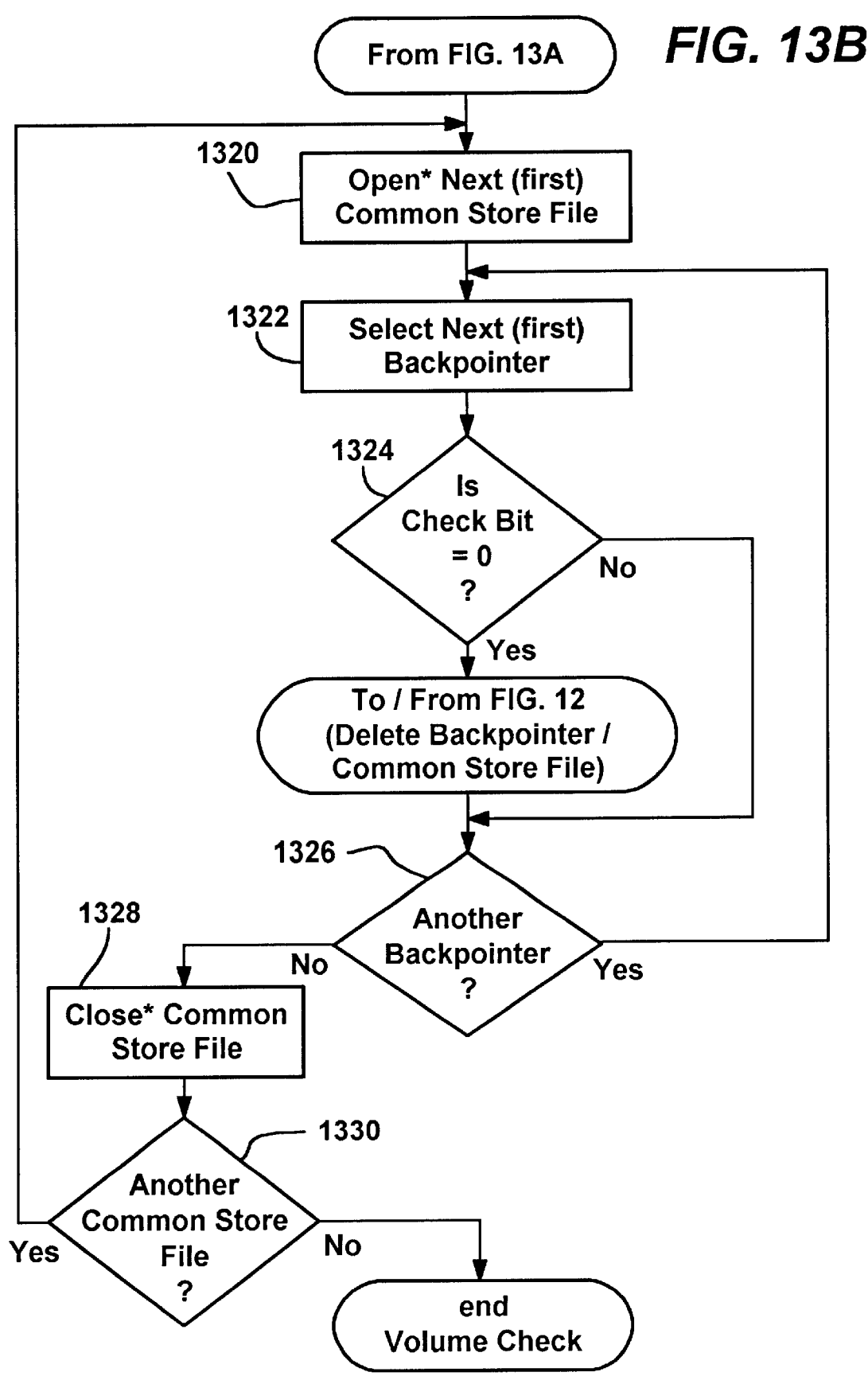

FIGS. 13A and 13B describe the volume check procedure 106, (shown in FIG. 2B as a dashed box to indicate that it runs only at certain times). Although not necessary to the invention, the volume check 106 increases the overall robustness of the SIS architecture by inspecting, and if needed, repairing the backpointer stream of the common store files. In general, the volume check procedure 106 is run because it is possible that the backpointer streams may become corrupted relative to the actual state of the files on a given file system volume 80. For example, if a user deletes a link file without the SIS driver filter 62' installed, the NTFS 100 will simply delete the file, because the SIS filter driver 62' will not be installed to handle the delete request and delete the backpointer in the corresponding common store file. This results in the common store file having a backpointer to a link file that does not exist. As a consequence, when any of the other links to that common store file are all deleted, even if properly deleted via SIS, the common store file would continue to occupy disk space since the one backpointer to the no-longer-existing file would remain. Alternatively, a common store file that did not properly include backpointer to a link file that points to it could be prematurely deleted.

The volume check 106 may be started whenever such an unbalanced condition is detected in the SIS metadata backpointer stream. Also, the volume check 106 may be periodically run, run if a non-clean shutdown is detected, or run under detection of some other circumstances that might cause a corrupt state. Note that the volume check 106 may be run while the system is otherwise running. However, as described above with reference to step 1204 of FIG. 12, during a volume check the common store file will not be deleted in response to the deletion or reconversion of a link file, because during a volume check the backpointer sets in the common store files are not deemed trustworthy.

The volume check procedure 106 begins in a first pass by opening each common store file, resetting to zero a check bit therein reserved in each backpointer for the volume check, and closing each file, as represented by steps 1300–1304 in FIG 13A. In FIGS. 13A and 13B, the asterisks (Open* and Close*) signify that the files are only opened and closed as appropriate, e.g., if not already open. A second pass, represented by steps 1306–1308 opens and closes each link file on the volume 80, which sets this check bit to one in the backpointer as described above with reference to step 632 of FIG. 6B. Note that NTFS efficiently finds the SIS links on a volume without examining each file on a volume, and thus the time to complete a volume check is based on to the number of SIS links on a volume, not the size or number of total files on the volume.

At this time, each backpointer that has a link file thereto has its check bit set to one. Accordingly, if the check bit of any backpointer is still at zero, then no link file corresponding thereto exists. Note that if a link file was found that was not listed in the backpointer stream of its corresponding common store file, and the signature in the link file (92) matches the signature in the common store file (94), the link file was added to the stream via step 628 of FIG. 6B.

A third pass, shown in FIG. 13B, examines the backpointers for any such zero check bits. To this end, at step 1320 the first common store file is selected and opened, and the first backpointer selected at step 1322. If at 1324 the check bit equals zero, then it is known that no such link file points to this common store file. The backpointer (and possibly the common store file) is thus deleted via the steps of FIG. 12, as described above. If the common store file still has backpointers and is thus not deleted, step 1326 repeats the process for any other backpointers in the stream.

When all backpointers in a common store file have had their check bits evaluated, step 1326 branches to step 1328 which closes the common store file as appropriate (i.e., it still exists and is not otherwise open to a link) and advances to step 1330. Step 1330 returns to step 1320 to repeat the bit check on the next common store file (if any). Once the common store files have each been evaluated in this manner, the volume check procedure 106 ends. At this time, the backpointers should properly reflect the state of the link files on this volume 80, since backpointers without corresponding links have been removed, and links that formerly did not have an entry in the backpointer stream of the appropriate common store file now have an entry.

Lastly, it should be noted that initial tests of the single instance store facility of the present invention have shown a significant savings in disk space. On file servers storing the data from the file systems from a large number of machines, SIS eliminated about forty-four percent of the file storage. Somewhat smaller savings around eight percent were obtained on non-server machines, however SIS has relatively low overhead in space and time, thus making SIS potentially worthwhile even with this lesser amount of savings. SIS also provides for fast copying, which is particularly apparent with relatively large files and large numbers of duplicate files. In particular, once a common store file exists, a copy operation essentially consists of copying only the very small (e.g., 300 or so byte) link file.

As can be seen from the foregoing detailed description, there is provided a method and system that provide for improved storage by representing file system data as a single instance thereof, while maintaining a logical distinction between the user files corresponding to that single instance of data, so that the semantics of private files are preserved. The implementation of SIS is small, self-contained and transparent to users of the file system.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having a file system of files, a method of storing data of first and second files having duplicate data, comprising the steps of:
    maintaining a single instance of the data;
    for the first file, providing a link file to the single instance of the data, the link file representing the first file to provide logically separate file system access to the single instance representation of the file data, the link file logically separate from the second file such that file system actions via the link file do not affect the data of the second file; and
    reclaiming storage space that was occupied by the duplicate data of the first file.

2. The method of claim 1 wherein the step of maintaining the single instance of the data comprises the step of copying the data from the first file to a file in a common store.

3. The method of claim 1 wherein the step of providing the link file comprises the step of converting the first file to the link file.

4. The method of claim 3 wherein the step of converting the first file to the link file comprises the step of deallocating data space of the first file.

5. The method of claim 3 wherein the step of converting the first file to the link file comprises the step of associating information including a special identifier with the link file.

6. The method of claim 5 wherein the step of associating information including the special identifier to the link file includes associating a reparse point with the link file.

7. The method of claim 5 wherein the information further includes data for identifying the single instance of data pointed to by the link file.

8. The method of claim 6 wherein the reparse point includes a reparse tag and reparse data.

9. The method of claim 8 further comprising the steps of computing a signature using the data of the first file, and storing the signature with the reparse data.

10. The method of claim 1 further comprising the step of receiving a request to open the link file.

11. The method of claim 1 wherein the single instance of the data is maintained in a common store file, and further comprising the steps of, receiving a request to open the link file, and passing to the file system a request to open the common store file.

12. The method of claim 11 further comprising the step of passing to the file system a request to open the link file.

13. The method of claim 1 wherein the single instance of the data is maintained in a common store file, and further comprising the steps of, computing a signature, associating the signature with the link file, associating the signature with the common store file, receiving a request to open the link file, comprising the signature associated with the link file with the signature associated with the common store file, and if the signatures match, passing to the file system a request to open the link file.

14. The method of claim 1 further comprising the steps of, opening the link file, and associating a context with the link file.

15. The method of claim 1 wherein the single instance of the data is maintained in a common store file, and further comprising the step of, storing a backpointer in the common store file for each link pointing thereto.

16. The method of claim 1 wherein the single instance of the data is maintained in a common store file, and further comprising the steps of, receiving a request to read from the link file, and passing to the file system a request to read from the common store file.

17. The method of claim 16 further comprising the steps of, receiving data read from the common store file, and returning the data read from the common store file in response to the request to read from the link file.

18. The method of claim 1 further comprising the steps of, receiving a request to read from the link file, determining that the request is to an allocated portion of the link file, and passing to the file system a request to read from the link file.

19. The method of claim 18 further comprising the steps of associating a context with the link file, and wherein the step of determining that the request is to an allocated portion of the link file comprises the step of evaluating information in the context.

20. The method of claim 1 further comprising the steps of, receiving a request to read from the link file, determining that the request is directed to at least one allocated portion of the link file and at least one unallocated portion of the link file, passing to the file system at least one request that corresponds to the unallocated portion to read from a file in a common store, passing to the file system at least one request that corresponds to the allocated portion to read from the link file, receiving data from the file system in response to each request passed thereto, merging the data from each read request into merged data, and returning the merged data in response to the request to read from the link file.

21. The method of claim 1 wherein the single instance of the data is maintained in a common store file, and further comprising the steps of, receiving a request to write data to the link file, and passing the request to the file system.

22. The method of claim 21 further comprising the steps of, associating a context with the link file, receiving status information from the file system indicative of a successful write to the link file, and recording in the context the location in the link file to which data was written.

23. The method of claim 21 further comprising the steps of, receiving status information from the file system indicative of a successful write to the link file, and closing the link file.

24. The method of claim 1 further comprising the steps of, receiving a request to close the link file, determining that the link file has data written thereto, reading data from the single instance corresponding to the link, merging the data with the data written to the link file as merged data, converting the link file to a converted file that is no longer linked to the single instance of data, including storing the merged data with the converted file, and closing the converted file.

25. The method of claim 24 wherein the step of converting the link file includes the step of removing a reference to the single instance from the converted file.

26. The method of claim 1 further comprising the steps of, receiving a request to close the link file, determining that the link file has data written thereto, attempting to allocate space in the link file for copying at least some data from the single instance thereto, and if not successful, closing the link file.

27. The method of claim 1 wherein the single instance of the data is maintained in a common store file, and further comprising the steps of, storing a backpointer in the common store file for each link file pointing thereto to identify that link file, receiving a request to delete a selected link file, deleting the backpointer in the common store file corresponding to that selected link file, and deleting the selected link file.

28. The method of claim 27 further comprising the steps of, determining if the step of deleting the backpointer in the common store file resulted in no remaining backpointers remaining in the common store file, and if so, deleting the common store file.

29. The method of claim 1 wherein the single instance of the data is maintained in a common store file of a volume, and further comprising the steps of, comparing each link file on the volume against each link pointer identified in a backpointer of a common store file, and if a selected backpointer does not correspond to a link file, deleting the backpointer.

30. The method of claim 1 wherein the single instance of the data is maintained in a common store file of a volume, and further comprising the steps of, comparing each link file on the volume against each link pointer identified in a backpointer of a common store file, and if a link file does not have a backpointer therefor in its corresponding common store file, adding a backpointer identifying that link file to its corresponding common store file.

31. A computer-readable medium having computer-executable instructions for performing the method of claim 1.

32. In a computer system, a system for storing the data of files having at least some duplicate data, comprising, a non-volatile storage for storing data including files of a file system, and a facility for maintaining a single instance of the duplicate data as a common store file of the file system, the facility providing a logically separate link file to the common store file for each file having duplicate data and deallocating storage space that stores the duplicate data, each link file logically separate from each other link file such that file system actions associated with one link file do not affect the data accessible via another link file, and the facility handling input and output requests to each link file to manage the linking of the link file to the common store file.

33. The system of claim 32 wherein the facility comprises a filter driver which receives input and output requests directed to the file system.

34. The system of claim 32 wherein the facility maintains the common store file by copying the data from a source file to a file in a common store, and converts the source file to a link file.

35. The system of claim 32 wherein the link file has a reparse point associated therewith, the reparse point including information identifying the link file as associated with the facility and identifying the common store file pointed to by the link file.

36. The system of claim 32 wherein the facility manages the linking of the link file to the common store file by intercepting each request to open the link file, and passing to the file system a request to open the common store file and the request to open the link file.

37. The system of claim 32 wherein the facility further includes a security mechanism for computing a signature, associating the signature with the link file, associating the signature with the common store file, and comparing the signature associated with the link file with the signature associated with the common store file.

38. The system of claim 32 further comprising a context associated with the link file.

39. The system of claim 32 wherein the facility stores a backpointer in the common store file for each link file pointing thereto to identify that link file.

40. The system of claim 32 wherein the facility manages the linking of the link file to the common store file by intercepting each request to read from the link file, passing to the file system a request to read from the common store file, and returning the data read from the common store file in response to the request.

41. The system of claim 32 wherein the facility manages the linking of the link file to the common store file by intercepting each request to read from the link file, determining that the request is to an allocated portion of the link file, and passing to the file system a request to read from the link file.

42. The system of claim 32 wherein the facility manages the linking of the link file to the common store file by intercepting each request to read from the link file, determining that the request is directed to at least one allocated portion of the link file and at least one unallocated portion of the link file, passing to the file system at least one request that corresponds to the unallocated portion to read from the common store file, passing to the file system at least one request that corresponds to the allocated portion to read from the link file, receiving data from the file system in response to each request passed thereto, merging the data from each read request into merged data, and returning the merged data in response to the request to read from the link file.

43. The system of claim 32 further comprising a context associated with the link file, and wherein the facility manages the linking of the link file to the common store file by passing each request to write to the link file to the file system, receiving status information from the file system indicative of a successful write to the link file, and recording in the context the location in the link file to which data was written.

44. The system of claim 32 wherein the facility manages the linking of the link file to the common store file by receiving a request to close the link file, passing the request to close the link file to the file system, and passing a request to close the common store file to the file system.

45. The system of claim 32 wherein the facility manages the linking of the link file to the common store file by receiving a request to close the link file, determining that the link file has data written thereto, reading data from the single instance corresponding to the link, merging the data with the data written to the link file as merged data, converting the link file to a converted file that is no longer linked to the single instance of data, including storing the merged data with the converted file, and closing the converted file.

46. The system of claim 32 wherein the facility manages the linking of the link file to the common store file by receiving a request to close the link file, determining that the link file has data written thereto, attempting to allocate space in the link file for copying at least some data from the single instance thereto, and if not successful, closing the link file.

47. The system of claim 32 further comprising a backpointer stored in the common store file for each link file pointing thereto, and wherein the facility manages the linking of the link file to the common store file by receiving a request to delete a selected link file, deleting the backpointer in the common store file corresponding to that selected link file, deleting the selected link file, determining if the step of deleting the backpointer in the common store file resulted in no remaining backpointers remaining in the common store file, and if so, deleting the common store file.

48. The system of claim 32 wherein the link file and the common store file are stored in a volume of the file system, and further comprising a volume check procedure for comparing each link file on the volume against each link pointer identified in a backpointer of a common store file, and if a selected backpointer does not correspond to a link file, deleting the backpointer.

49. The system of claim 32 wherein the link file and the common store file are stored in a volume of the file system, and further comprising a volume check procedure for comparing each link file on the volume against each link pointer identified in a backpointer of a common store file, and if a link file does not have a backpointer therefor in its corresponding common store file, adding a backpointer identifying that link file to its corresponding common store file.

50. In a computer system having a file system, a method of storing the data of a selected plurality of files of the file system, wherein each of the selected plurality of files have at least partially identical contents with one another, comprising the steps of, maintaining a single instance file representing at least part of the file contents that are partially identical in each of the plurality of files, reclaiming at least some of the storage space that was identical in the selected plurality of files and providing a link file to the single instance file for each file having contents represented thereby, each link file logically separate from one another.

51. The method of claim 50 wherein the selected plurality of files of the file system comprise two files having identical contents.

52. The method of claim 50 wherein the single instance file maintains the entire identical contents.

53. The method of claim 50 wherein the single instance file is maintained in a common store with at least one other single instance file.

54. The method of claim 50 further comprising the steps of, receiving a request to open the link file, passing to the file system a request to open the single instance file, and passing to the file system a request to open the link file.

55. The method of claim 50 further comprising the step of, storing a backpointer in association with the single instance file for each link pointing thereto.

56. The method of claim 50 further comprising the steps of, receiving a request to read from the link file, passing to the file system a request to read from the single instance file, receiving data read from the single instance file, and returning the data read from the single instance file in response to the request to read from the link file.

57. The method of claim 50 further comprising the steps of, receiving a request to read from the link file, determining that the request is directed to at least one allocated portion of the link file and at least one unallocated portion of the link file, passing to the file system at least one request that corresponds to the unallocated portion to read from the single instance file, passing to the file system at least one request that corresponds to the allocated portion to read from the link file, receiving data from the file system in response to each request passed thereto, merging the data from each read request into merged data, and returning the merged data in response to the request to read from the link file.

58. The method of claim 50 further comprising the steps of, associating a context with the link file, receiving a request to write data to the link file, passing the request to the file system, receiving status information from the file system indicative of a successful write to the link file, and recording in the context the location in the link file to which data was written.

59. The method of claim 50 further comprising the steps of, receiving a request to close the link file, determining that the link file has data written thereto, reading data from the single instance file corresponding to the link, merging the data with the data written to the link file as merged data, converting the link file to a converted file that is no longer linked to the single instance file, including storing the merged data with the converted file, and closing the converted file.

60. A computer-readable medium having computer-executable instructions for performing the method of claim 50.

61. In a computer system having a file system of files, a method of storing the data of files having at least some duplicated data, comprising, maintaining a single instance of the data, for each file having duplicated data, providing a link file to the single instance of the data representing each file, each link file logically separate from each other link file, opening the link file, and associating a context with the link file.

62. The method of claim 61 wherein the single instance of the data is maintained in a common store file, and further comprising, receiving a request to write data to the link file, and passing the request to the file system.

63. The method of claim 62 further comprising, receiving status information from the file system indicative of a successful write to the link file, and recording in the context the location in the link file to which data was written.

64. The method of claim 62 further comprising, receiving status information from the file system indicative of a successful write to the link file, and closing the link file.

65. The method of claim 61 further comprising, receiving a request to close the link file, determining that the link file has data written thereto, reading data from the single instance corresponding to the link, merging the data with the data written to the link file as merged data, converting the link file to a converted file that is no longer linked to the single instance of data, including storing the merged data with the converted file, and closing the converted file.

66. The method of claim 61 further comprising, receiving a request to read from the link file, determining that the request is to an allocated portion of the link file, including evaluating information in the context, and passing to the file system a request to read from the link file.

67. A computer-readable medium having computer-executable instructions for performing the method of claim 61.

68. In a computer system having a file system of files, a method of storing the data of files having at least some duplicated data, comprising, maintaining a single instance of the data, for each file having duplicated data, providing a link to the single instance of the data representing each file, each link logically separate from each other link, and associating a reparse point with the file.

69. The method of claim 68 wherein the reparse point includes a reparse tag and reparse data.

70. The method of claim 69 further comprising the steps of computing a signature using the data of the source file, and storing the signature with the reparse data.

71. In a computer system, a system for storing the data of files having at least some duplicate data, comprising, a non-volatile storage for storing data including files of a file system, and a facility for maintaining a single instance of the duplicate data as a common store file of the file system, the facility providing a logically separate link file to the common store file for each file having duplicate data, each link file having a reparse point associated therewith, the reparse point including information identifying the link file as associated with the facility and identifying the common store file pointed to by the link file, and the facility handling input and output requests to each link file to manage the linking of the link file to the common store file.

72. In a computer system, a system for storing the data of files having at least some duplicate data, comprising, a non-volatile storage for storing data including files of a file system, a facility for maintaining a single instance of the duplicate data as a common store file of the file system, the facility providing a logically separate link file to the common store file for each file having duplicate data, the facility handling input and output requests to each link file to manage the linking of the link file to the common store file, and a context associated with the link file.

73. The system of claim 72 wherein the facility manages the linking of the link file to the common store file by passing each request to write to the link file to the file system, receiving status information from the file system indicative of a successful write to the link file, and recording in the context the location in the link file to which data was written.

74. In a computer system having a file system, a method of storing the data of a selected plurality of files of the file system, wherein each of the selected plurality of files have at least partially identical contents with one another, comprising the steps of, maintaining a single instance file representing at least part of the file contents that are partially identical in each of the plurality of files, providing a link to the single instance file for each file having contents represented thereby, each link logically separate from one another, and associating a context with at least one link.

75. A computer-readable medium having computer-executable instructions for performing the method of claim 74.

* * * * *

UNITED STATES PATENT AND TRADEMARK OFFICE
CERTIFICATE OF CORRECTION

PATENT NO. : 6,477,544 B1
DATED : November 5, 2002
INVENTOR(S) : Bolosky et al.

It is certified that error appears in the above-identified patent and that said Letters Patent is hereby corrected as shown below:

Column 2,
Lines 11-12, "delayed. copying" should read -- delayed copying --.

Column 3,
Line 17, "is block diagram" should read -- is a block diagram --.

Column 11,
Line 42, "with the to requested data" should read -- with the requested data --.

Column 14,
Line 57, "based on to the number" should read -- based on the number --.

Column 15,
Line 4, "If at 1324" should read -- If at step 1324 --
Line 37, "300 or so byte" should read -- 300 or so bytes --.

Column 16,
Line 39, "comprising" should read -- comparing --.

Signed and Sealed this

Nineteenth Day of October, 2004

JON W. DUDAS
*Director of the United States Patent and Trademark Office*